United States Patent
Liu et al.

(10) Patent No.: US 9,159,309 B2
(45) Date of Patent: Oct. 13, 2015

(54) HANDHELD SINGING APPARATUS

(71) Applicant: Ozaki International Co., Ltd., New Taipei (TW)

(72) Inventors: Keng-Yuan Liu, New Taipei (TW); Tzu Jen Mao, New Taipei (TW)

(73) Assignee: OZAKI INTERNATIONAL CO., LTD., New Taipei (TW)

( * ) Notice: Subject to any disclaimer, the term of this patent is extended or adjusted under 35 U.S.C. 154(b) by 0 days.

(21) Appl. No.: 14/163,131

(22) Filed: Jan. 24, 2014

(65) Prior Publication Data

US 2015/0075356 A1  Mar. 19, 2015

(30) Foreign Application Priority Data

Sep. 18, 2013  (TW) .............................. 102217631 U

(51) Int. Cl.

| G10H 1/08 | (2006.01) |
|---|---|
| G10H 7/00 | (2006.01) |
| G10H 1/36 | (2006.01) |
| H04M 1/11 | (2006.01) |
| H04M 1/04 | (2006.01) |
| A45F 5/10 | (2006.01) |
| G10H 1/02 | (2006.01) |
| H04M 1/725 | (2006.01) |

(52) U.S. Cl.
CPC *G10H 1/361* (2013.01); *A45F 5/10* (2013.01); *G10H 1/02* (2013.01); *H04M 1/04* (2013.01); *H04M 1/11* (2013.01); *H04M 1/72558* (2013.01); *H04M 1/72527* (2013.01)

(58) Field of Classification Search
CPC ..... G10H 1/361; G10H 2220/211; H04R 1/08
USPC .................. 84/625; 434/307 A; 361/679.55; 248/291.1
See application file for complete search history.

(56) References Cited

U.S. PATENT DOCUMENTS

| 5,349,480 A * | 9/1994 | Takao ........................ 360/74.1 |
|---|---|---|
| 6,520,776 B1 * | 2/2003 | Furukawa ................ 434/307 A |
| 6,702,584 B2 * | 3/2004 | Ueshima et al. .......... 434/307 A |
| 7,973,230 B2 * | 7/2011 | Mahowald ..................... 84/609 |
| 8,422,208 B2 * | 4/2013 | Wang ...................... 361/679.01 |
| 8,941,989 B2 * | 1/2015 | Pollex ..................... 361/679.59 |
| 2003/0224334 A1 * | 12/2003 | Boys ............................ 434/169 |
| 2006/0228683 A1 * | 10/2006 | Jianping ................. 434/307 A |
| 2007/0292831 A1 * | 12/2007 | Lee .......................... 434/307 A |
| 2008/0282871 A1 * | 11/2008 | Chen ............................. 84/610 |
| 2012/0107785 A1 * | 5/2012 | Pan et al. ................. 434/307 A |
| 2012/0168581 A1 * | 7/2012 | Cheng et al. ............... 248/206.2 |
| 2012/0273637 A1 * | 11/2012 | Huang ...................... 248/291.1 |
| 2014/0085814 A1 * | 3/2014 | Kielland ................. 361/679.55 |
| 2014/0168890 A1 * | 6/2014 | Barnard .................. 361/679.55 |

* cited by examiner

*Primary Examiner* — Jeffrey Donels
(74) *Attorney, Agent, or Firm* — Muncy, Geissler, Olds & Lowe, P.C.

(57) ABSTRACT

A handheld singing apparatus, capable of being cooperated with a handheld electronic device having a screen for operation, includes a holding member, a supporting seat and a connecting portion. The holding member is approximately formed as rod shaped and has a first end and a second end opposite to the first end. The supporting seat is capable of receiving and fastening with the handheld electronic device, so that the screen is faced to a direction far from the holding member. The connecting portion is connected between the first end of the holding member and the supporting seat, so that the supporting seat is rotatable relative to the holding member.

25 Claims, 21 Drawing Sheets

HANDHELD SINGING APPARATUS

CROSS-REFERENCES TO RELATED APPLICATIONS

This non-provisional application claims priority under 35 U.S.C. §119(a) on patent application Ser. No. 10/2,217,631 filed in Taiwan, R.O.C. on Sep. 18, 2013, the entire contents of which are hereby incorporated by reference.

BACKGROUND

1. Technical Field

The disclosure relates to a handheld singing apparatus, and particularly to a handheld singing apparatus cooperating with a handheld electronic device.

2. Related Art

Recently, as the quality of life is promoted, people have a greater range of relaxation activities. For instance, it is very common for people to invite their friends to go to KTV outlets to relax.

In addition to singing at KTV outlets, some people sing at home. For those who do not have a good sense of pitch, an apparatus or a program for pitch adjustment is essential. For example, Memorex Company has manufactured a singing device called "Singstand Home Karaoke System", the outline of the singing device is a microphone holder and has a placing region for placing the multimedia player; nevertheless, the microphone holder cannot be carried conveniently.

AppToyz Company also manufactured a portable singing device called "AppSing portable karaoke system", the outline of the portable singing device is a microphone. The portable singing device has a receiving groove extended from the end thereof for placing the mobile phone. Using this, the user sings songs using the microphone along with watching the lyrics shown of the screen of the mobile phone. However, since the mobile phone is disposed behind the microphone, it is difficult for a user to watch the lyrics on the screen of the mobile phone.

SUMMARY

In view of this, the disclosure provides a handheld singing apparatus which can solve the problem met in the prior arts.

One invention concept of the disclosure provides a handheld singing apparatus which is capable of being cooperated with a handheld electronic device having a screen for operation. The handheld singing apparatus includes a holding member, a supporting seat and a connecting portion. The holding member is approximately formed as rod shaped and has a first end and a second end opposite to the first end. The supporting seat is capable of receiving and fastening with the handheld electronic device, so that the screen is faced to a direction far from the holding member. The connecting portion is connected between the first end of the holding member and the supporting seat, so that the supporting seat is rotatable relative to the holding member.

In one implementation aspect, the supporting seat further includes an audio receiving member.

In one implementation aspect, the holding member is hollowed and has a receiving space; the holding member further includes a signal processing circuit and an audio cable. The signal processing circuit is disposed in the receiving space and connected electrically to the audio receiving member for receiving a first audio signal outputted from the audio receiving member, and the first audio signal is signally processed by the signal processing circuit for outputting. The audio cable includes a connecting wire and an audio terminal. One end of the connecting wire is connected to the signal processing circuit to accept the first audio signal outputted from the signal processing circuit and passing through the holding member. The audio terminal is disposed at the other end of the connecting wire for being inserted into an audio port of the handheld electronic device to output the first audio signal to the handheld electronic device.

In one implementation aspect, the signal processing circuit includes a mixer which can receive and mix the first audio signal with a second audio signal outputted from the handheld electronic device and passing through the audio cable for outputting a third audio signal.

In one implementation aspect, the holding member further includes an audio outputting port disposed at the second end thereof, the audio outputting port is connected to the mixer to accept the third audio signal.

Based on the above, according to the handheld singing apparatus of the disclosure, the user holds the holding member with one hand easily, and the user operates the screen of the handheld electronic device with the other hand. Additionally, the angle of the supporting seat is adjustable, so that the user can watch the screen of the handheld electronic device conveniently and comfortably. Furthermore, according to the disclosure, the singing of the user and the background music outputted from the handheld electronic device are mixed by the mixer and outputted through the audio outputting port, so that the user can hear the background music and the singing of the user clearly and simultaneously.

The detailed features and advantages of the disclosure are described below in great detail through the following embodiments, the content of the detailed description is sufficient for those skilled in the art to understand the technical content of the disclosure and to implement the disclosure there accordingly. Based upon the content of the specification, the claims, and the drawings, those skilled in the art can easily understand the relevant objectives and advantages of the disclosure.

BRIEF DESCRIPTION OF THE DRAWINGS

The disclosure will become more fully understood from the detailed description given herein below for illustration only and thus not limitative of the disclosure, wherein.

DETAILED DESCRIPTION

The contents described hereinafter are provided for those who are skilled in this art so that those who are skilled in this art can understand the substantial technical approaches efficiently. Therefore, the details of the methods, processes, structures and circuits known by skilled in this art are omitted for ensuring the contents can be totally realized by those skilled in this art.

It should be realized that, the phrase "one embodiment" mentioned hereinafter means that the combination of the described characters, structures or the features of this embodiment can be included in at least one of the implementation aspects of the disclosure. Wherein, the phrase "In one embodiment" may be related to many different embodiments which are compatible with each other.

The spatial-relation terminological terms, for example, below, above, etc., are applied to describe the basic relationships between the members/features of the disclosure shown in the figures. It should be realized that, besides showing the orientational relationship of the members/features in the figures, the spatial-relation terminological terms also represents the orientational relationships of the members/features upon the disclosure is operating or corresponding to other devices. For example, when the disclosure shown in the figure is flapped, the member which is below another member will become above said another member. Therefore, the exemplary terminological term "below" can represent "disposed above . . . " or "disposed below . . . ". Similarly, the disclosure shown in the figures can be presented by other orientations (like 90 degrees clockwise/counterclockwise rotation) corresponding to the operation state or receiving state of the disclosure.

Here, the phrase "and/or" includes any of, many of or all of the combinations of the listed terms. It should be realized that, the singular term "a/an" and "the" can also includes the plural condition, unless in the number of the member are clearly defined in this patent document. It should also be realized that, when the phrases "comprise(s)" and/or "include(s)" are applied in this patent document for disclosing a character, step, member and/or component, further character(s), step(s), member(s), component(s) and/or the combination thereof are not excluded from the disclosure.

Figure 1:
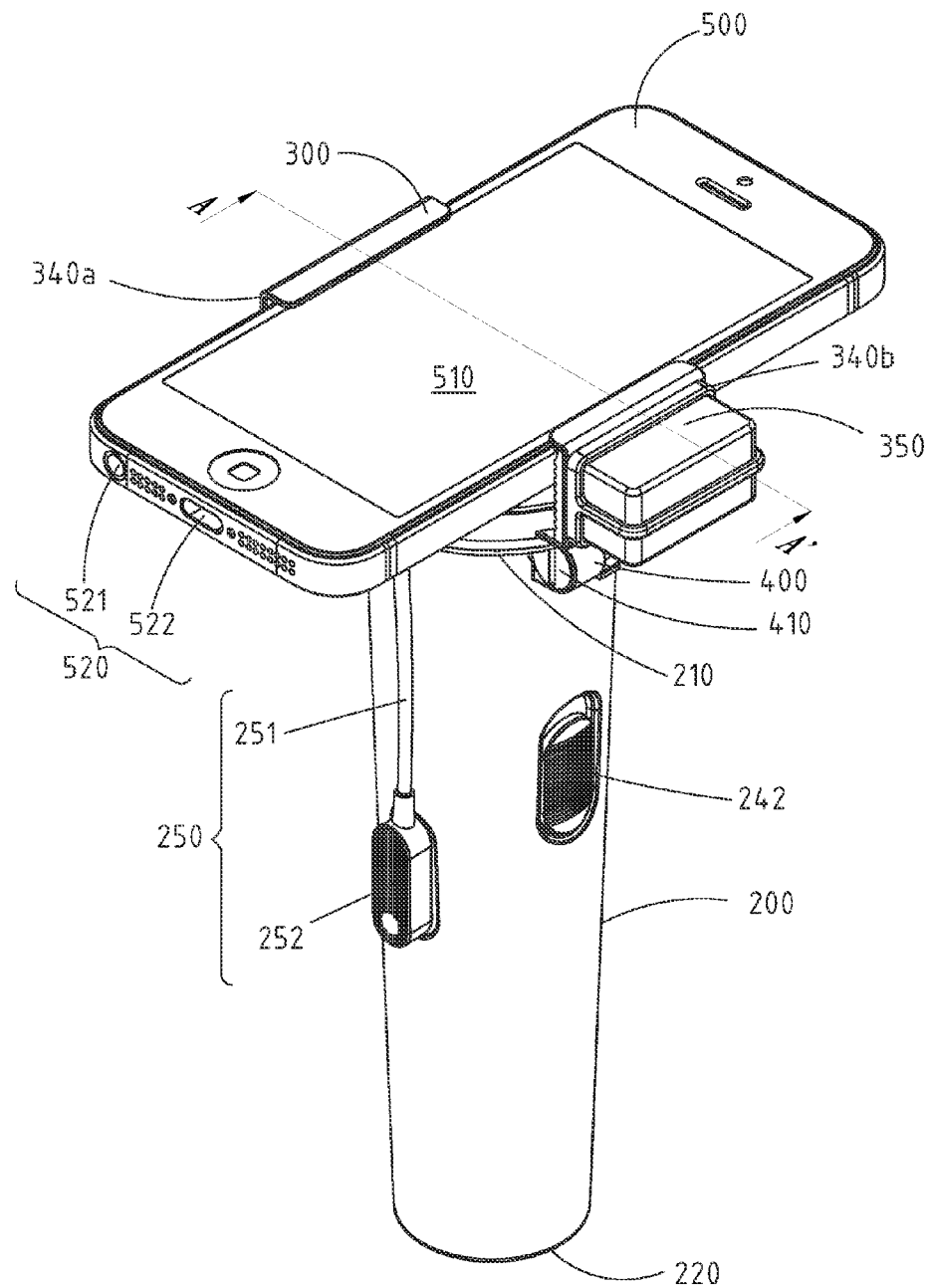
FIG. 1 is an operating schematic view (1) of a handheld singing apparatus of a first embodiment of the disclosure.

FIG. 1 is an operating schematic view (1) of a handheld singing apparatus 100 of a first embodiment of the disclosure.

Figure 2:
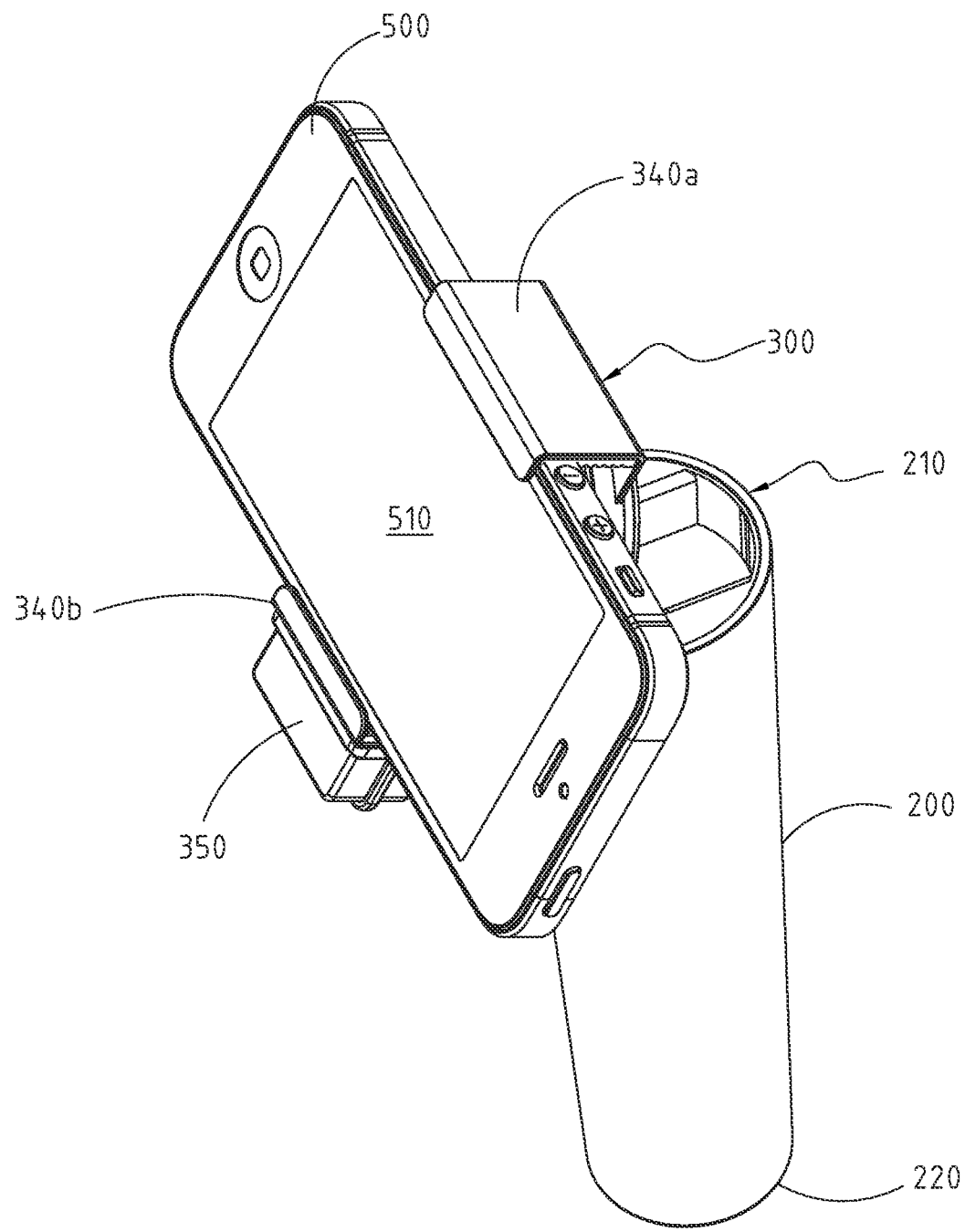
FIG. 2 is an operating schematic view (2) of the handheld singing apparatus of the first embodiment of the disclosure.

FIG. 2 is an operating schematic view (2) of the handheld singing apparatus 100 of the first embodiment of the disclosure.

Please refer to FIG. 1 and FIG. 2, in which the handheld singing apparatus 100 is cooperated with a handheld electronic device 500 having a screen 510 for operation. The handheld singing apparatus 100 includes a holding member 200, a supporting seat 300 and a connecting portion 400. Here, "iPhone®", the smartphone manufactured by Apple Company, is taken as the example of the handheld electronic device 500, but embodiments of the disclosure are not limited thereto. The handheld electronic device 500 can also be the mobile phones manufactured by other companies, or can be a multimedia player, a tablet computer, an e-book reader, a digital photo frame, a handheld game console and so forth. The screen 510 can be, but not limited to, a mono-colored liquid crystal display, a multi-colored liquid crystal display or a touch panel.

The holding member 200 is approximately formed as rod shaped (here, approximately formed as a cylinder), and has a first end 210 and a second end 220 opposite to the first end 210. Here, the cross-sectional area of the holding member 200 is gradually reduced from the first end 210 toward the second 220. That is, the width of the holding member 200 is gradually reduced toward the end portion thereof, but embodiments of the disclosure are not limited thereto. In some embodiments, the holding member 200 can be other geometric cylinders such as a triangular cylinder, a rectangular cylinder, etc., or can be other shapes The supporting seat 300 is capable of receiving and fastening with the handheld electronic device 500, so that the screen 510 is faced to a direction far from the holding member 200; in this embodiment, the holding member 200 is extended from the first end 210 toward the second end 220 along a direction far from the screen 510 (as shown in FIG. 1). The connecting portion 400 is connected between the first end 210 of the holding member 200 and the supporting seat 300, such that the supporting seat 300 is rotatable relative to the holding member 200. Based on this, the user can adjust the angle between the supporting seat 300 and the holding member 200 for watching the screen 510 of the handheld electronic device 500 on the supporting seat 300 conveniently and comfortably upon holding the holding member 200 (as shown in FIG. 2). Here, the connecting portion 400 is embodied by pivot means, namely, the connecting portion 400 includes a pivot shaft 410 and a plurality of pivot holes 420 respectively connected to the holding member 200 and the supporting seat 300, so that the pivot shaft 410 passes through the pivot holes 420 and the holding member 200 is pivotally connected to the supporting seat 300 (as shown in FIG. 3)

Accordingly, the user can hold the holding member 200 with his/her mouth approaching to the supporting seat 300 for presenting speaking or singing activities corresponding to the texts or graphs shown on the screen 510 of the handheld electronic device 500. Here, the handheld electronic device 500 is capable of executing an application program and presents a game thereof in which the voices (talking or singing), of the user is received by a microphone (not shown), built-in the handheld electronic device 500 and the tempos, pitches, volumes or the combination thereof of the voices are scored. Based on this, the user can learn what the correct tempos and pitches are upon singing songs in cooperating with the application program; additionally, the stage design concept of the application program combines education with recreation. But, in the disclosure, the voice receiving is not limited to the microphone built-in the handheld electronic device 500; in some embodiment, besides providing a receiving function for the handheld electronic device 500, the supporting seat 300 further includes an audio receiving member 350 for receiving voices, the details about the audio receiving member 350 are described later.

Figure 3:
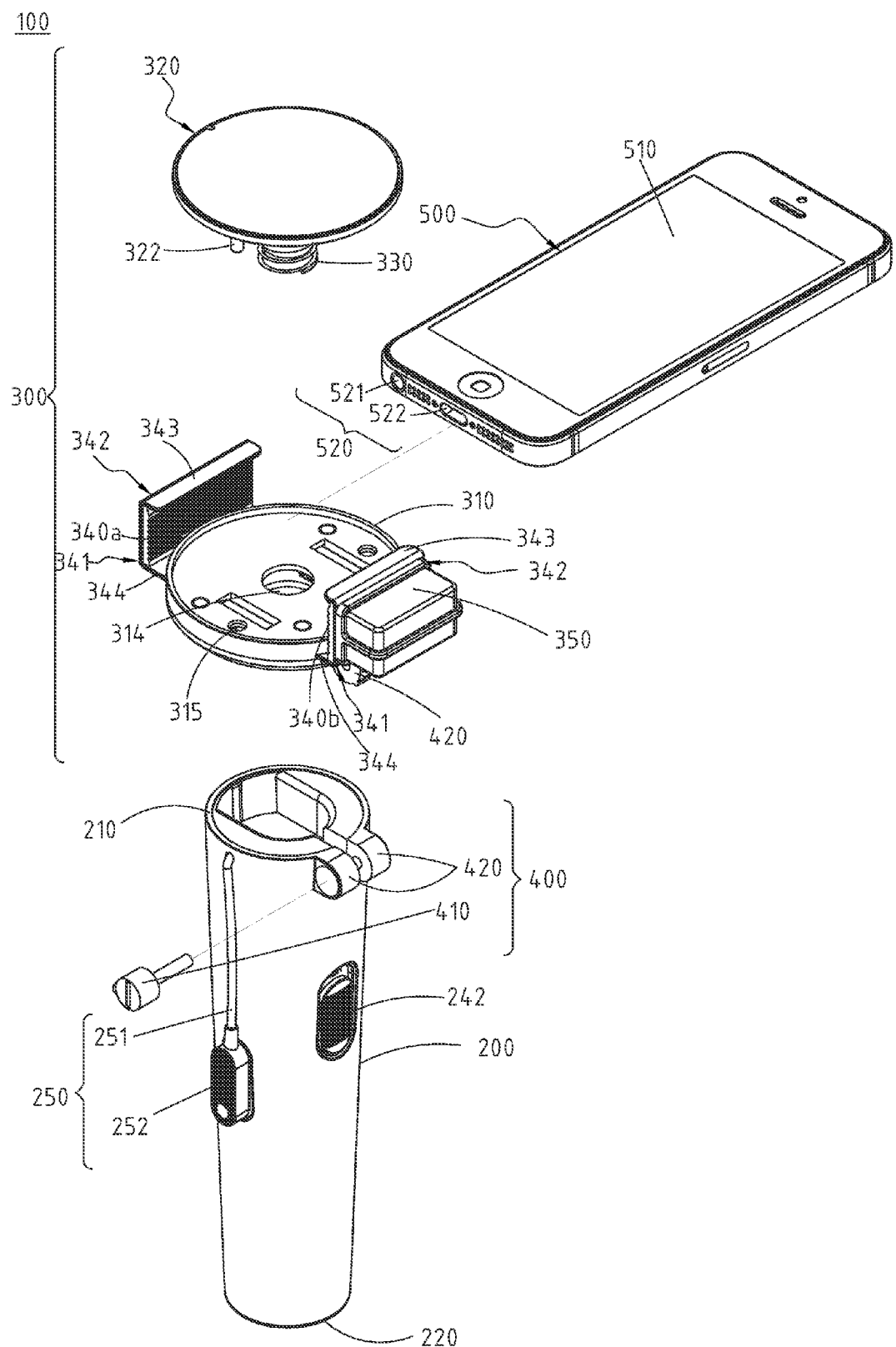
FIG. 3 is an exploded view of the handheld singing apparatus of the first embodiment of the disclosure.
Figure 4:
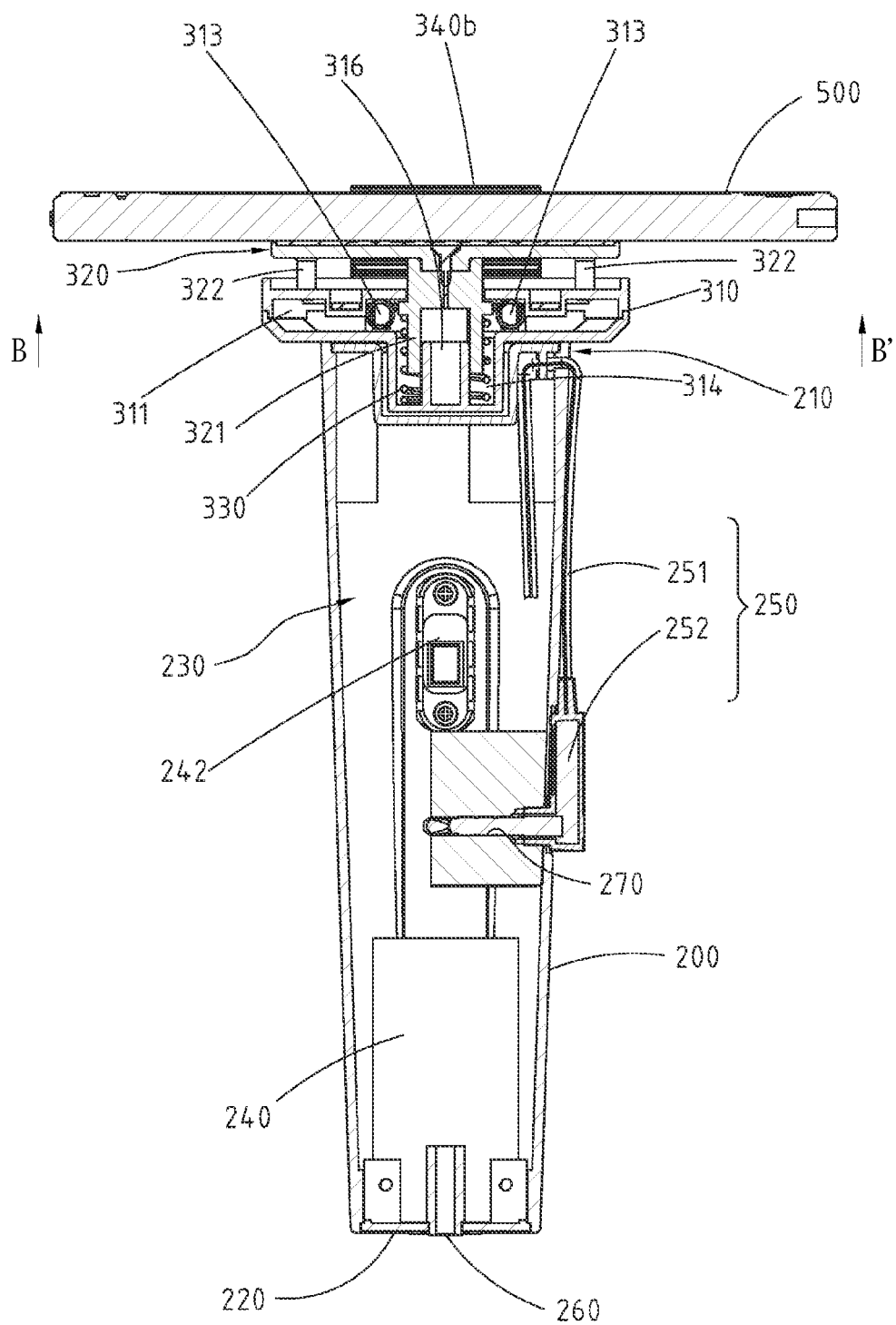
FIG. 4 is a cross-sectional view along line A-A' shown in FIG. 1.

FIG. 3 is an exploded view of the handheld singing apparatus 100 of the first embodiment of the disclosure. FIG. 4 is a cross-sectional view along line A-A' shown in FIG. 1.

As shown in FIG. 3, the supporting seat 300 includes a bottom wall 310, an abutting plate 320, an elastic member 330 and two sidewalls 340a, 340b. Here, the shape of the bottom wall 310 and that of the abutting plate 320 are approximately the same (here, rounded), but embodiments of the disclosure are not limited thereto. In some embodiments, the shape of bottom wall 310 and that of the abutting plate 320 can be the same as the shape of the cross-section of the holding member 200, but embodiments of the disclosure are not limited thereto.

As shown in FIG. 4, the elastic member 330 is connected between the bottom wall 310 and the abutting plate 320, so that the elastic member 330 is capable of pushing the abutting plate 320 to move toward a direction far from the bottom wall 310. Please refer to FIG. 3 and FIG. 4, a center of the bottom wall 310 is recessed inward to form a positioning groove 314 for receiving the elastic member 330. Here, the elastic member 330 is a spring. The abutting plate 320 has a positioning rod 321 extended from a center of one side thereof in which one side of the abutting plate 320 is adjacent to the bottom wall 310 (that is, the lower face of the abutting plate 320), and the spring is winding on the periphery of the positioning rod 321 (that is, the spring is enclosed onto the periphery of the positioning rod 321) so as to be disposed in the positioning groove 314 along with the positioning rod 321. The positioning groove 314 has a sleeving rod 316 extended from a center of the bottom thereof. The positioning rod 321 is tubular and capable of sleeving with the sleeving rod 316. Based on this, the abutting plate 320 is moved vertically relative to the bottom wall 310 stably.

In some embodiments, the abutting plate 320 has a protruded rod 322 extended from one side thereof which is adjacent to the bottom wall 310 (that is, the lower face of the abutting plate 320), and the bottom wall 310 has a recessed hole 315 corresponding to the protruded rod 322 opened on one side thereof which is adjacent to the abutting plate 320 (that is, the upper face of the bottom wall 310). Based on this, the stability of the moving of the abutting plate 320 is enhanced.

Figure 7:
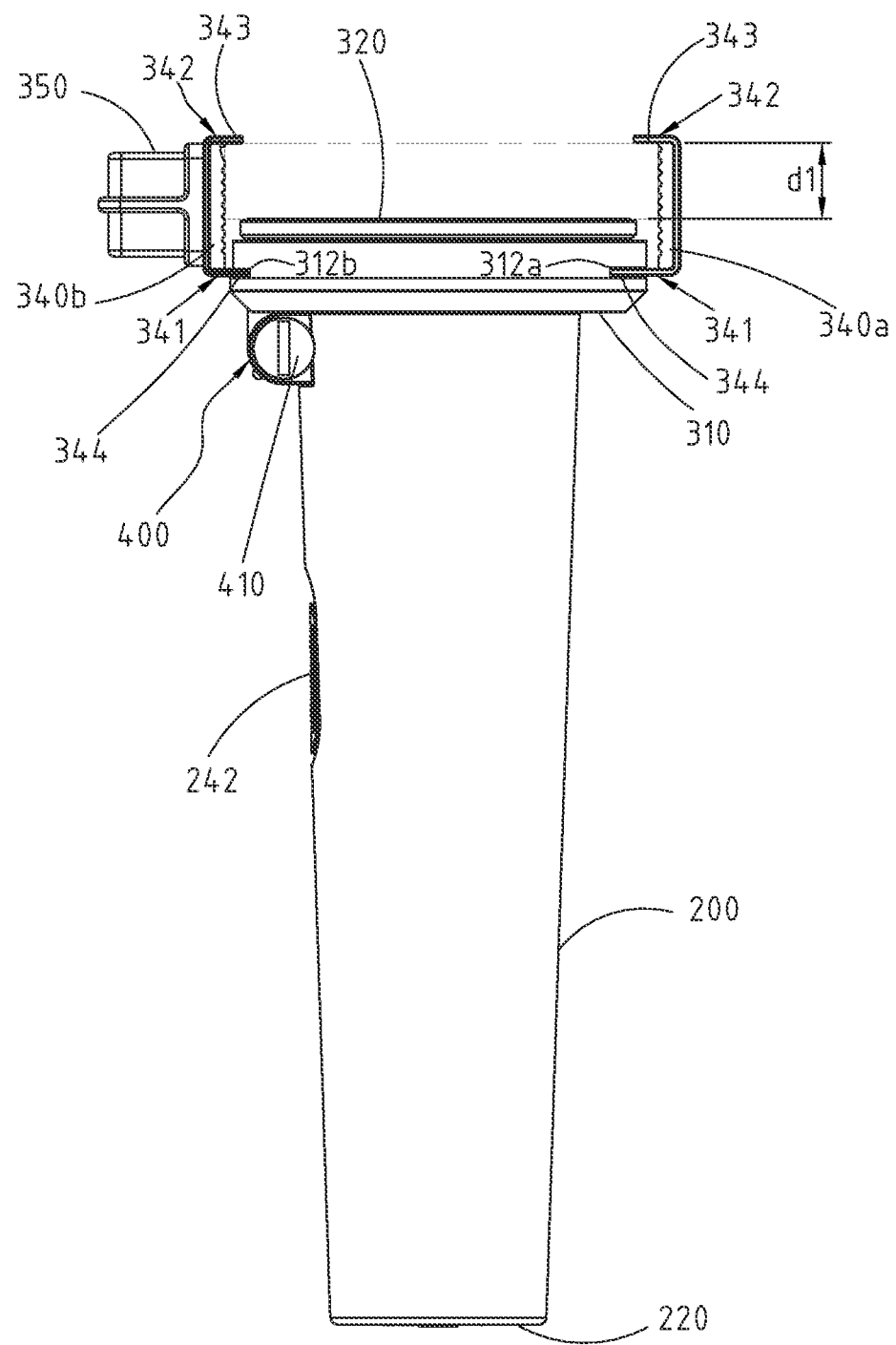
FIG. 7 is another lateral view of the handheld singing apparatus of the first embodiment of the disclosure.

As shown in FIG. 3 and FIG. 4, the two sidewalls 340a, 340b are opposingly disposed at two sides of the bottom wall 310, and bottom portions of the two sidewalls 340a' 340b are opposingly connected to the bottom wall 310. The sidewall 340a includes a limiting wall 343 located at a top 342 thereof, and the limiting wall 343 of the sidewall 340a is extended toward the sidewall 340b; similarly, the sidewall 340b includes a limiting wall 343 located at a top 342 thereof, and the limiting wall 343 of the sidewall 340b is extended toward the sidewall 340a. Based on this, please refer to FIG. 3 and FIG. 5, in which when the handheld electronic device 500 is received in the supporting seat 300, the handheld electronic device 500 is abutted against between the two limiting walls 343 and the abutting plate 320; in this case, the lower surface of the handheld electronic device 500 is abutted against the abutting plate 320, and the upper surface of the handheld electronic device 500 is abutted against the limiting walls 343, such that the handheld electronic device 500 is fastened between the limiting walls 343 and the abutting plate 320 via the elastic force contributed from the elastic member 330. Therefore, the supporting seat 300 can receive handheld electronic devices 500 with different thickness; in this embodiment, the supporting seat 300 can receive the handheld electronic device 500 with the thickness thereof being approximately smaller than the maximum distance d1 between the limiting walls 343 and the abutting plate 320 (as shown in FIG. 7), but embodiments of the disclosure are not limited thereto.

Figure 5:
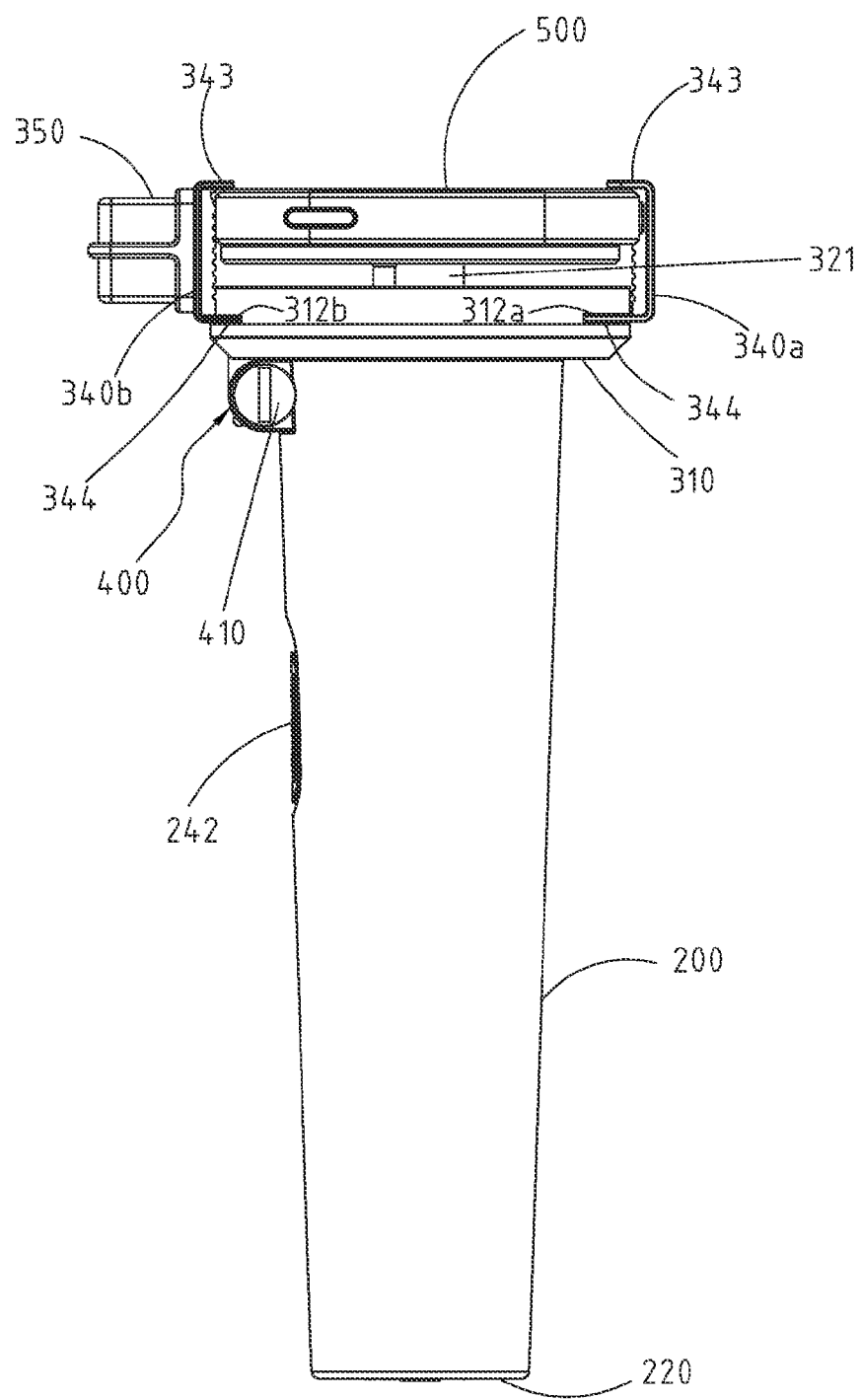
FIG. 5 is a lateral view of the handheld singing apparatus of the first embodiment of the disclosure.
Figure 6:
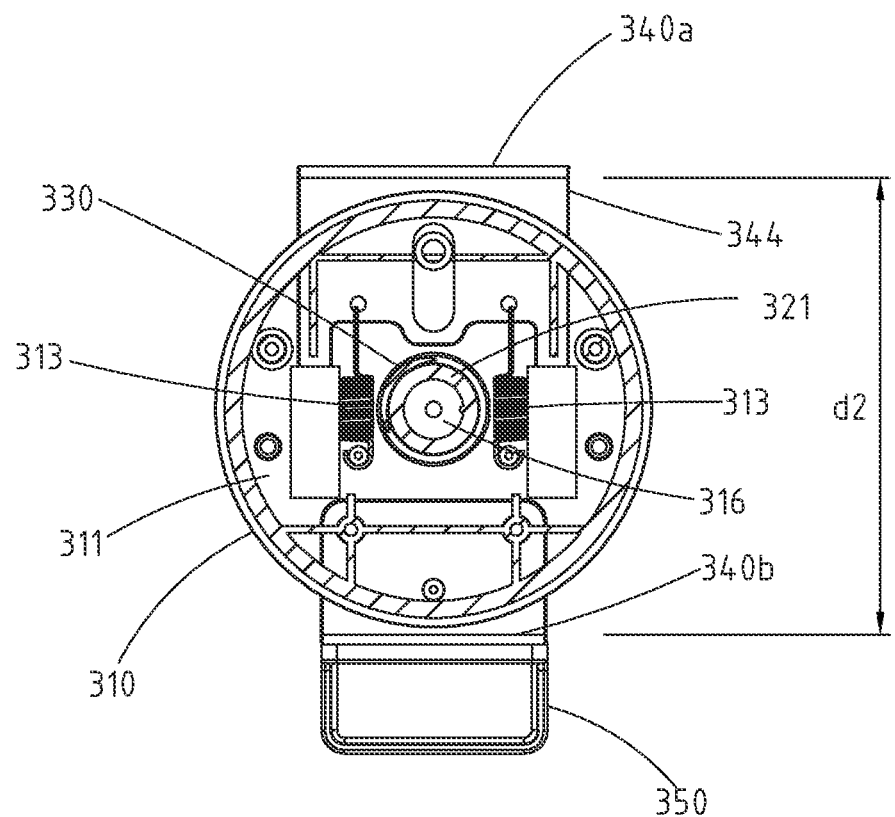
FIG. 6 is a cross-sectional view along line B-B' shown in FIG. 4.

FIG. 5 is a lateral view of the handheld singing apparatus 100 of the first embodiment of the disclosure. FIG. 6 is a cross-sectional view along line B-B' shown in FIG. 4. FIG. 7 is another lateral view of the handheld singing apparatus 100 of the first embodiment of the disclosure.

Please refer to FIG. 5 and FIG. 6, in which the bottom wall 310 is hollow and has a cavity 311, and the bottom wall 310 has two openings 312a, 312b disposed at the side thereof. The bottom 341 of the sidewall 340a is bent and extended to form a connecting wall 344, and the connecting wall 344 of the sidewall 340a passes through the opening 312a and is inserted into the cavity 311; similarly, the bottom 341 of the sidewall 340b is bent and extended to form a connecting wall 344, and the connecting wall 344 of the sidewall 340b passes through the opening 312b and is inserted into the cavity 311. As shown in FIG. 6, the bottom wall 310 further includes at least one elastic body 313 connected between an inner wall of the cavity 311 and the connecting wall 344 of the sidewall 340a (here, the number of the elastic body 313 is two, and the elastic body 313 substantially can be spring). Based on this, the sidewall 340a is capable of moving outwardly (that is, moving far from a center of the cavity 311), so that the user can adjust the distance d2 between the two sidewalls 340a, 340b for correspondingly receiving the handheld electronic devices 500 with different widths. Thereby, the handheld electronic device 500 is buckled between the two sidewalls 340a, 340b by the pulling force the elastic body 313 applying to the sidewall 340a (the force toward the center of the cavity 311).

In this embodiment, the connecting wall 344 of the sidewall 340b is securely connected to the inner wall of the cavity 311, so that the sidewall 340b cannot move relative to the bottom wall 310, but embodiments of the disclosure are not limited thereto; in some embodiments, the connecting wall 344 of the sidewall 340b is connected to the inner wall of the cavity 311 via the elastic body 313, so that the connecting wall 344 of the sidewall 340b is movable relative to the bottom wall 310 (the detail moving mechanism of the sidewall 340b is similar to that of the sidewall 340a).

Accordingly, it is understood that the supporting seat 300 is capable of receiving handheld electronic devices 500 with the sizes thereof being slightly different; for instance, the supporting seat 300 can also receive a handheld electronic device 500 with a protective shell enclosed thereon.

Please refer to FIG. 3 and FIG. 5 again, in which the supporting seat 300 further includes an audio receiving member 350. The audio receiving member 350 is disposed at one side of the sidewall 340b far from the sidewall 340a (that is, the outer side of the sidewall 340b). Here, the audio receiving member 350 is approximately formed as a cuboid, and the area of one face contacted to the sidewall 340b is approximately equal to the area of the sidewall 340b; but embodiments of the disclosure are not limited thereto, the audio receiving member 350 can also be other structures.

Figure 8:
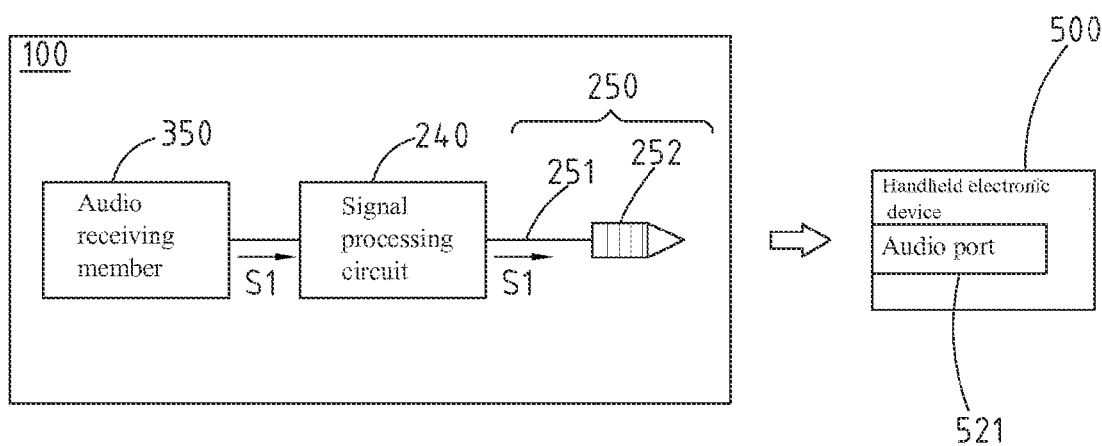
FIG. 8 is a circuit block diagram of the handheld singing apparatus of the first embodiment of the disclosure and a handheld electronic device.

FIG. 8 is a circuit block diagram of the handheld singing apparatus 100 of the first embodiment of the disclosure and a handheld electronic device 500.

Please refer to FIG. 4 and FIG. 8, in which the holding member 200 is hollowed and has a receiving space 230. The holding member 200 further includes a signal processing circuit 340 disposed in the receiving space 230. Parts or all of the signal processing circuit 340 are disposed on a printed circuit board (not shown). Here, for ease of understanding, the detailed structure of the signal processing circuit 340 and the wires are omitted in FIG. 4.

The signal processing circuit 240 is connected electrically to the audio receiving member 350 for receiving a first audio signal S1 outputted from the audio receiving member 350, and the first audio signal S1 is signally processed by the signal processing circuit 240 for outputting. Here, the first audio signal S1 is an electrical signal which is acoustic-electro converted from a foreign voice received by the audio receiving member 350; when the user speaks or sings toward the audio receiving member 350, the first audio signal S1 is the voice of the user.

An audio cable 250 is connected to an output end of the signal processing circuit 240 and includes a connecting wire 251 and an audio terminal 252. One end of the connecting wire 251 is connected to the signal processing circuit 240 to accept the first audio signal S1 which is signally processed. The audio terminal 252 is disposed at the other end of the connecting wire 251 for being inserted into an audio port 521 of the handheld electronic device 500 to output the first audio signal S1 to the handheld electronic device 500.

Figure 9:
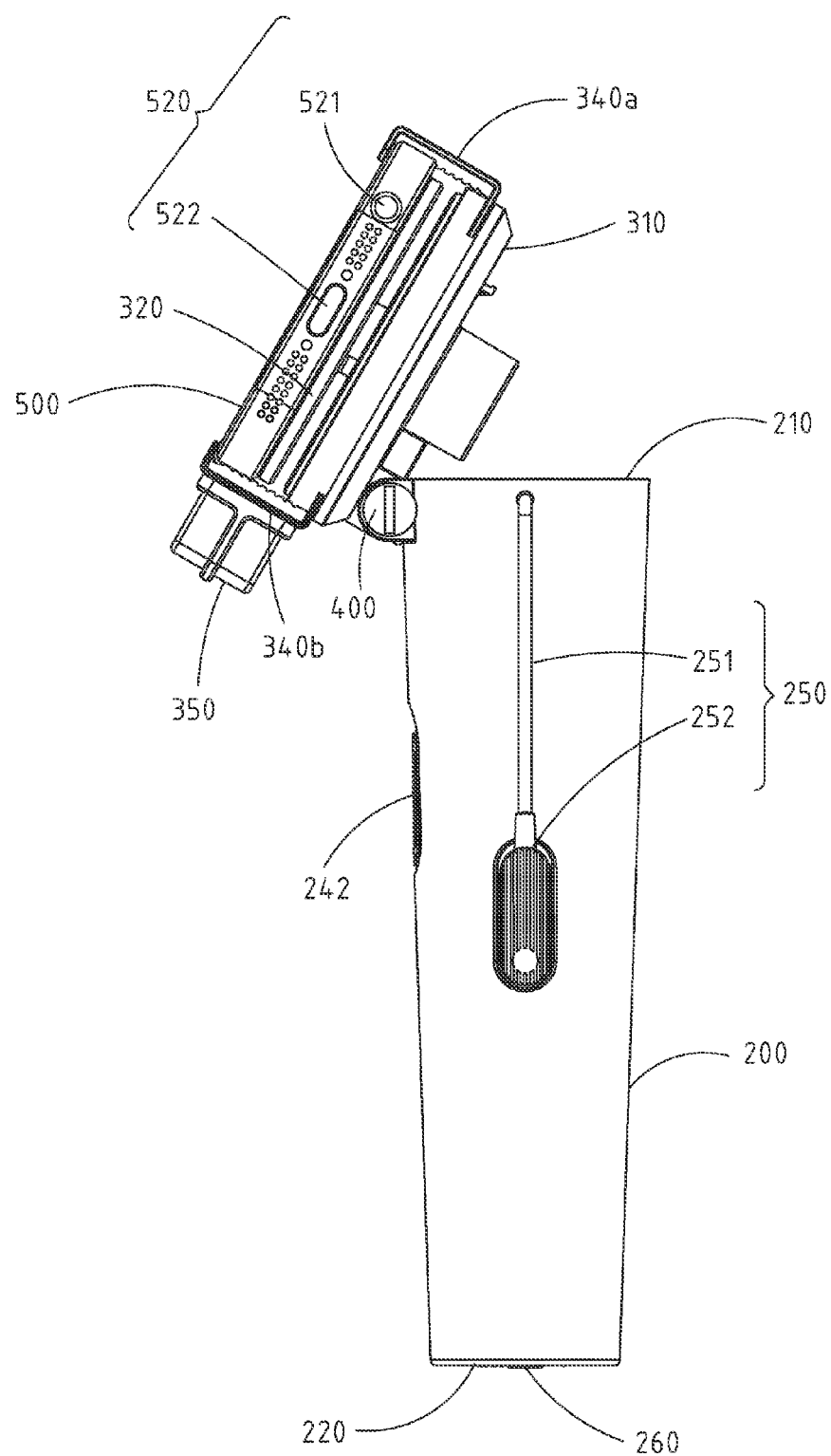
FIG. 9 is a further lateral view of the handheld singing apparatus of the first embodiment of the disclosure.

FIG. 9 is a further lateral view of the handheld singing apparatus 100 of the first embodiment of the disclosure. As shown in FIG. 4 and FIG. 9, the connecting wire 251 is passing through an outer wall of the holding member 200 (here, the connecting wire 251 is passing through the first end 210 of the holding member 200), and a lateral surface of the holding member 200 is recessed to form a receiving groove 270 for receiving the audio terminal 252. Here, the audio terminal 252 is approximately formed as L-profiled; one end of the audio terminal 252 disposed at the receiving groove 270 is a conductive metal portion; the other end of the audio terminal 252 is formed as a flat plate (here, the plate is a rectangular plate with chamfered edges), and the groove opening of receiving groove 270 has a recession with thin and wide appearance corresponding to the flat plate. Based on this, when the audio terminal 252 is inserted into the receiving groove 270, the audio terminal 252 can be covered on the receiving groove 270 for preventing dusts or moist being entering into the receiving space 230 of the holding member 200; but, the outline of the audio terminal 232 of embodiments of the disclosure is not limited thereto.

Figure 10:
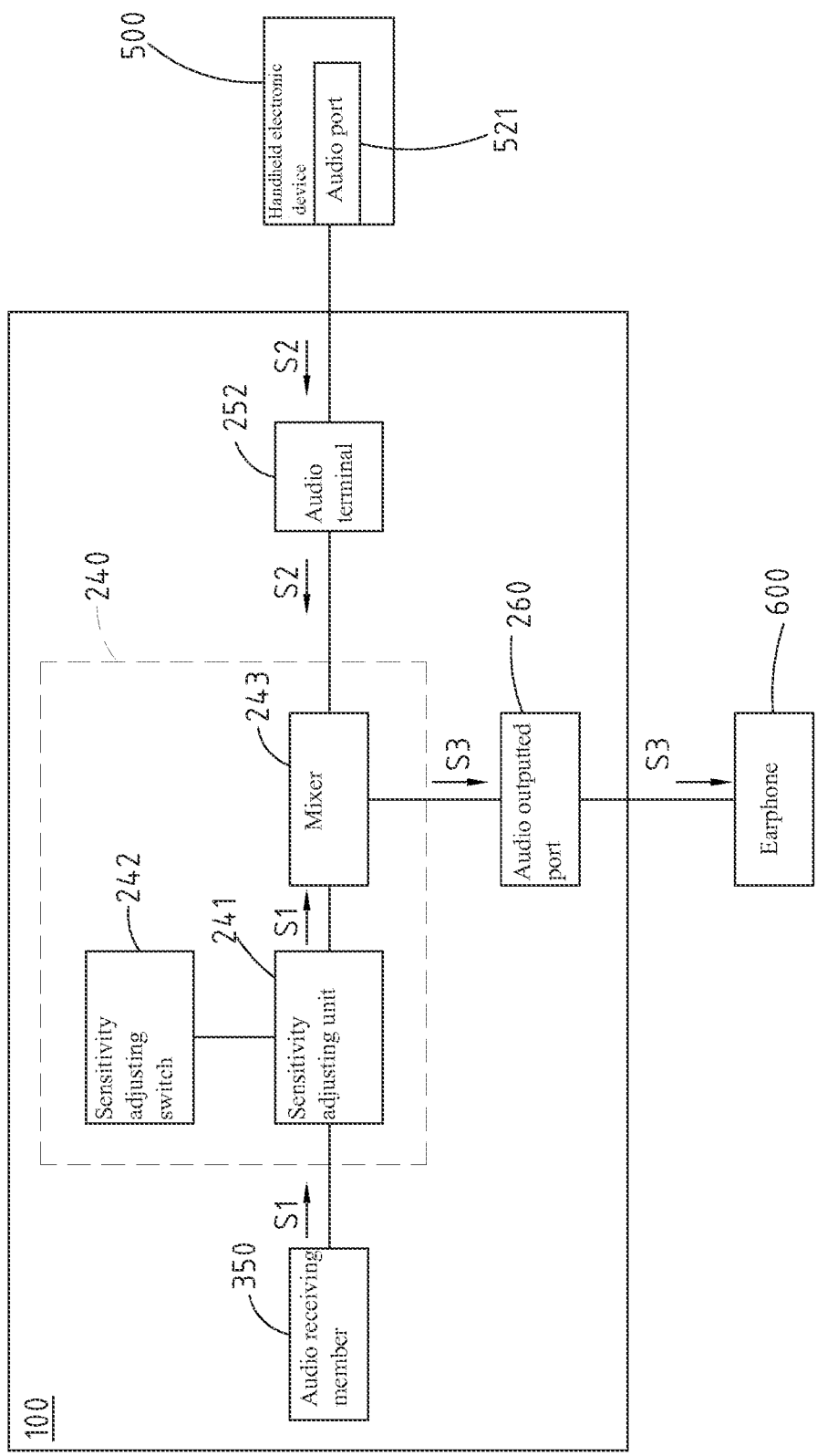
FIG. 10 is a detailed circuit block diagram of the handheld singing apparatus of the first embodiment of the disclosure.

FIG. 10 is a detailed circuit block diagram of the handheld singing apparatus 100 of the first embodiment of the disclosure.

As shown in FIG. 10, the signal processing circuit 240 includes, but not limited to, a sensitivity adjusting unit 241, a sensitivity adjusting switch 242 and a mixer 243. The sensitivity adjusting unit 241 responds to the setting of the sensitivity adjusting switch 242 to adjust the amplitude of the first audio signal S1. Here, the sensitivity adjusting switch 242 is disposed at the lateral surface of the holding member 200 (as shown in FIG. 1).

Figure 11:
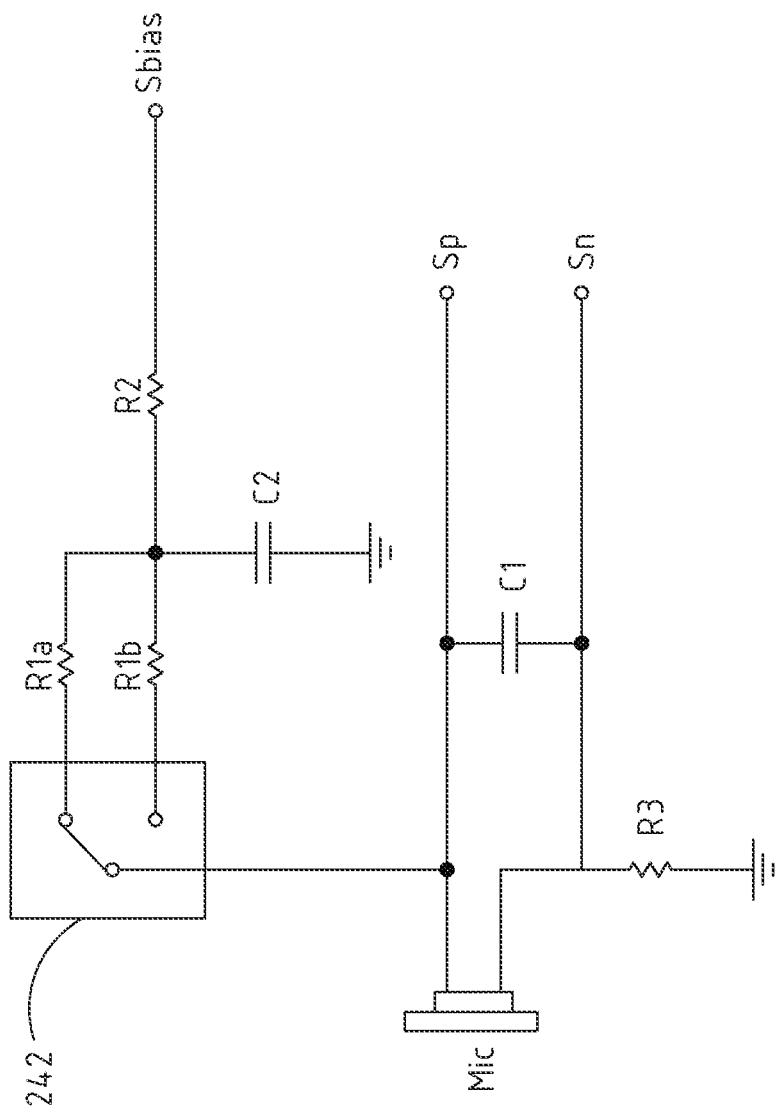
FIG. 11 is a circuit diagram of a sensitivity adjusting circuit of the handheld singing apparatus of the first embodiment of the disclosure.

Please refer to FIG. 11, which is a circuit diagram of a sensitivity adjusting circuit of the handheld singing apparatus 100 of the first embodiment of the disclosure and is provided for showing the concrete implementation aspect of the aforementioned sensitivity adjusting unit 241 and the sensitivity adjusting switch 242. The audio receiving member 350 includes at least one microphone body Mic (here, the number of the microphone body Mic is one). In this case, a differential circuit is taken as one example of the sensitivity adjusting circuit; the output end of the differential circuit has a signal standard end Sbias, a signal positive end Sp and a signal negative end Sn for outputting the first audio signal S1 with a differential format, but embodiments of the disclosure are not limited thereto. The signal positive end Sp and the signal negative end Sn are respectively connected electrically to the microphone body Mic with a filter capacitor C1 parallel connected therebetween. The filter capacitor C1 is provided for removing the noises of the first audio signal S1 outputted from the microphone body Mic. The signal negative end Sn is further connected to a grounding resistance R3. The microphone body Mic and the signal standard end Sbias have the sensitivity adjusting switch 242, two parallel connected current-limiting resistances R1a, R1b, a grounding capacitor C2 and a current-limiting resistance R2 sequentially connected therebetween. Here, the sensitivity adjusting switch 242 is a toggle switch, so that the signals are passing through the current-limiting resistance R1a or the current-limiting resistance R1b according to the adjustments of the user. Based on this, the quantity of the bias of the first audio signal S1 is adjusted by using the two current-limiting resistances R1a, R1b with different resistance values. For example, upon the first audio signal S1 being selectively passing through the current-limiting resistance R1a which has a smaller resistance value, the signal intensity of the first audio signal S1 is relative larger, so that the sensitivity of the sensitivity adjusting circuit is higher to be applied in noisy circumstances. On the contrary, once the first audio signal S1 is selectively passing through the current-limiting resistance R1b which has a larger resistance value, the signal intensity of the first audio signal S1 is relative smaller; hence, the voices with smaller volumes will be filtered as noises. As a result, such case is applicable in quiet circumstances and voice signals with fewer noises are acquired.

Please refer to FIG. 4 and FIG. 10 again, in which the holding member 200 further includes an audio outputting port 260 disposed at a center of the bottom portion of the second end 220 thereof. The mixer 243 is connected electrically between the sensitivity adjusting unit 241, the audio terminal 252 and the audio outputting port 260 to receive and mix the first audio signal S1 with a second audio signal S2 outputted from the handheld electronic device 500 and passing through the audio cable 250 for outputting a third audio signal S3 to the audio outputting port 260. Here, the second audio signal S2 is an audio signal outputted from the handheld electronic device 500 upon executing the application program, for example, the second audio signal S2 can be the background music of the stages of the game. The mixer 243 mixes the first audio signal S1 with the second audio signal S2 to generate the third audio signal S3 including the background music of the game and the voices of the user. Therefore, the user can insert the cable of the earphone 600 into the audio outputting port 260 to hear the background music and the voices of the user simultaneously; under this arrangement, not only the interferences are kept from the circumstance so that the user can concentrate on the game, but also the user can hear the voices clearly to know the deficiencies and to improve immediately.

In some embodiments, the signal processing circuit 240 does not include the mixer 243; correspondingly, the holding member 200 does not include the audio outputting port 260.

In some embodiments, the signal processing circuit 240 does not include the sensitivity adjusting unit 241 and the sensitivity adjusting switch 242.

Figure 12:
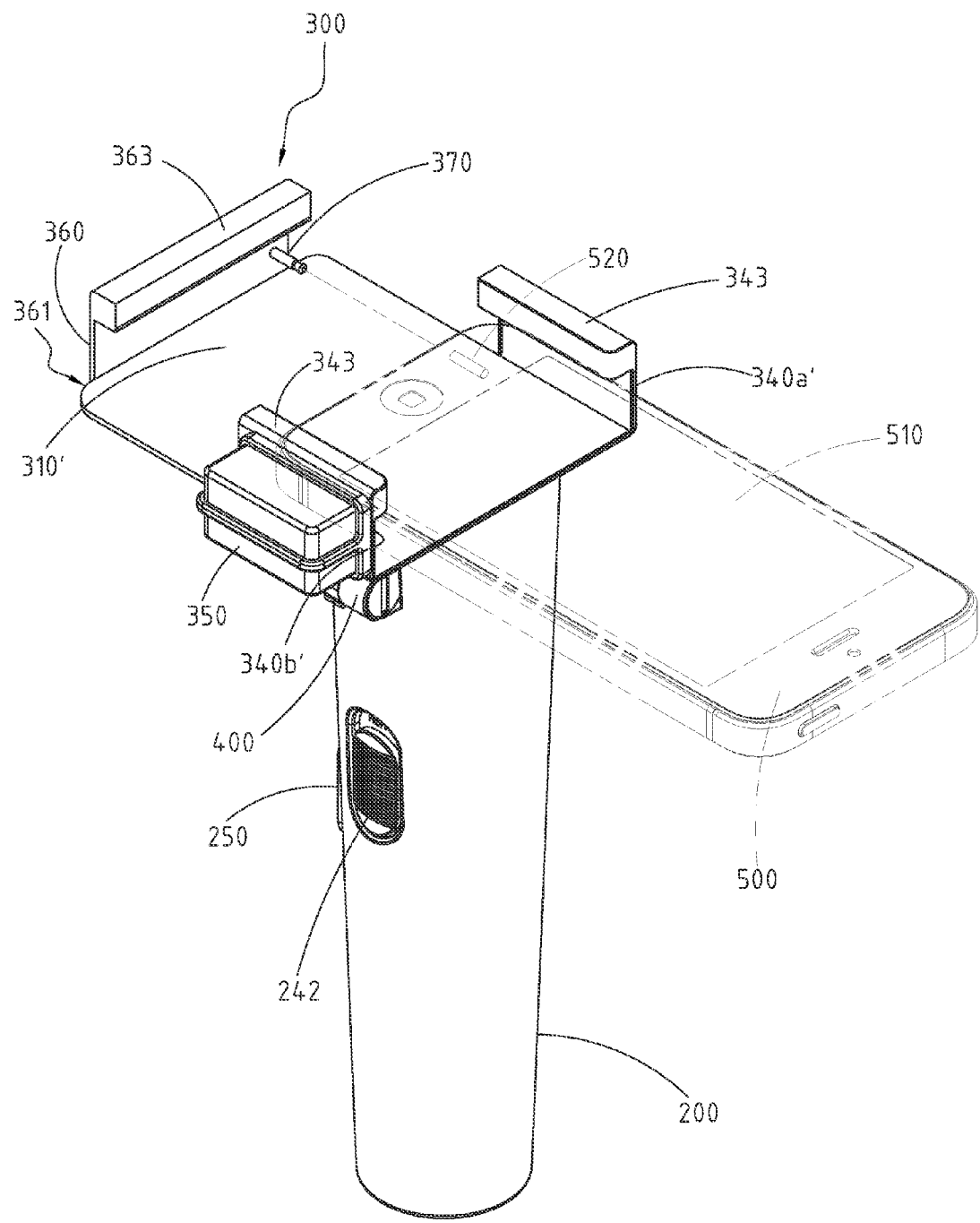
FIG. 12 is a perspective view of a handheld singing apparatus of a second embodiment of the disclosure.

FIG. 12 is a perspective view of a handheld singing apparatus 100 of a second embodiment of the disclosure Please refer to FIG. 12, in which the structure of the supporting seat 300 of the second embodiment is different from that of the first embodiment; the supporting seat 300 of the second embodiment further includes a blocking wall 360.

The supporting seat 300 includes a bottom wall 310', two sidewalls 340a', 340b', a blocking wall 360 and a connecting terminal 370. Here, the bottom wall 310' is approximately formed as a rectangular plate, but embodiments of the disclosure are not limited thereto. The two sidewalls 340a', 340b' are opposingly disposed at two edges of the bottom wall 310' (here, the two edges are the two long edges of the rectangle), and bottom portions of the two sidewalls 340a', 340b' are connected to the bottom wall 310'. Here, the two sidewalls 340a', 340b' are vertically connected to the bottom wall 310'. Similar to the sidewalls 340a, 340b of the first embodiments, the sidewall 340a', 340b' also respectively have the limiting walls 343. The bottom portion of the blocking wall 360 is connected to the bottom wall 310', and the blocking wall 360 is disposed at one side of the extension direction of the two sidewalls 340a', 340b'. The top portion of the blocking wall 360 has a limiting wall 363 disposed vertically with the bottom wall 310'. Based on this, the two sidewalls 340a', 340b', the blocking wall 360 and the bottom wall 310' form a space therebetween for fastening the handheld electronic device 500.

The connecting terminal 370 is disposed at one side of the blocking wall 360 adjacent to the two sidewalls 340a', 340b' (that is, the inner side of the blocking wall 360), so that when the handheld electronic device 500 is received in the supporting seat 300, the connecting terminal 370 is inserted into a connecting port 520 of the handheld electronic device 500. As shown in FIG. 9, the connecting port 520 can be the audio port 521 and/or a data transmitting port 522 (Here, the data transmitting port 522 is a Lighting® interface, but embodiments of the disclosure are not limited thereto; for example, can be an USB interface and so forth.). Therefore, the connecting terminal 270 can be the audio terminal corresponding to the audio port 521 (as shown in FIG. 12), and/or the data transmitting terminal corresponding to the data transmitting port 522.

Figure 13:
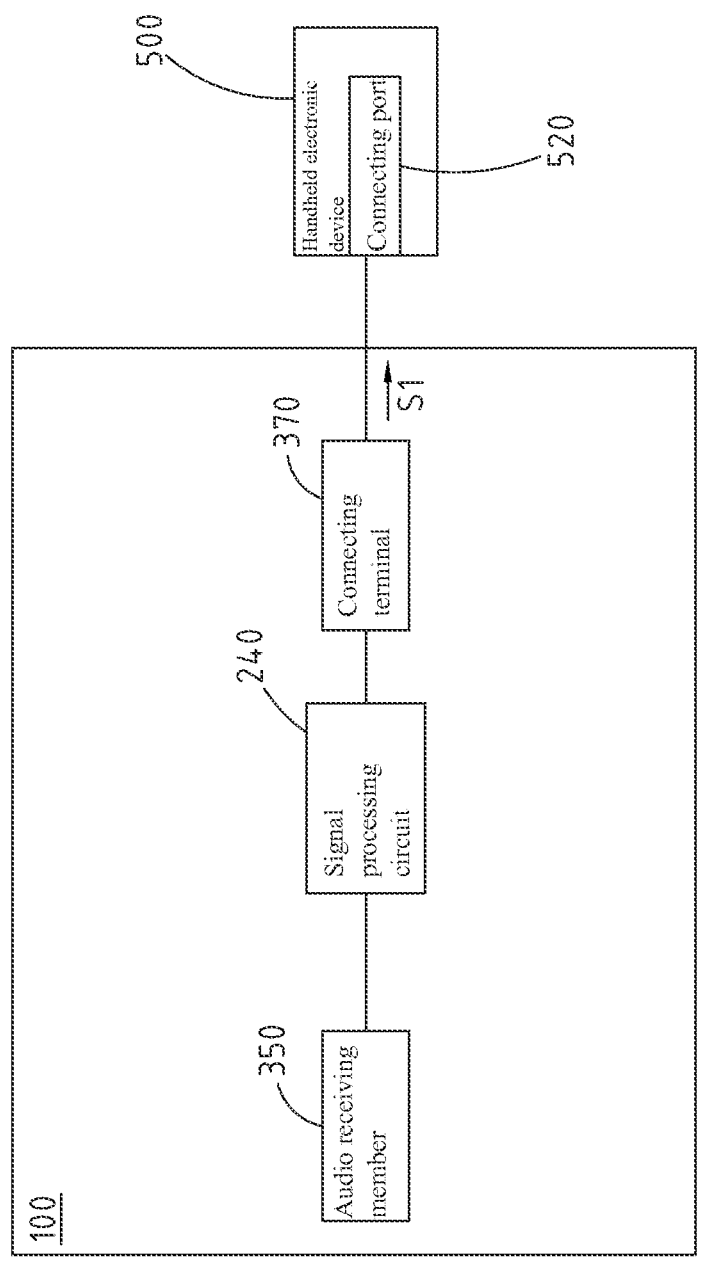
FIG. 13 is a circuit block diagram of the handheld singing apparatus of the second embodiment of the disclosure and a handheld electronic device.

FIG. 13 is a circuit block diagram of the handheld singing apparatus 100 of the second embodiment of the disclosure and a handheld electronic device 500. As shown in FIG. 13, the connecting terminal 370 is connected electrically to the signal processing circuit 240, so that the first audio signal S1 which is signally processed by the signal processing circuit 240 is transmitted to the handheld electronic device 500 through the connecting port 520. Here, the structures and the operating principles of the audio receiving member 350, the signal processing circuit 340 and other components are similar to that of the first embodiment and can be referred thereto.

Figure 14:
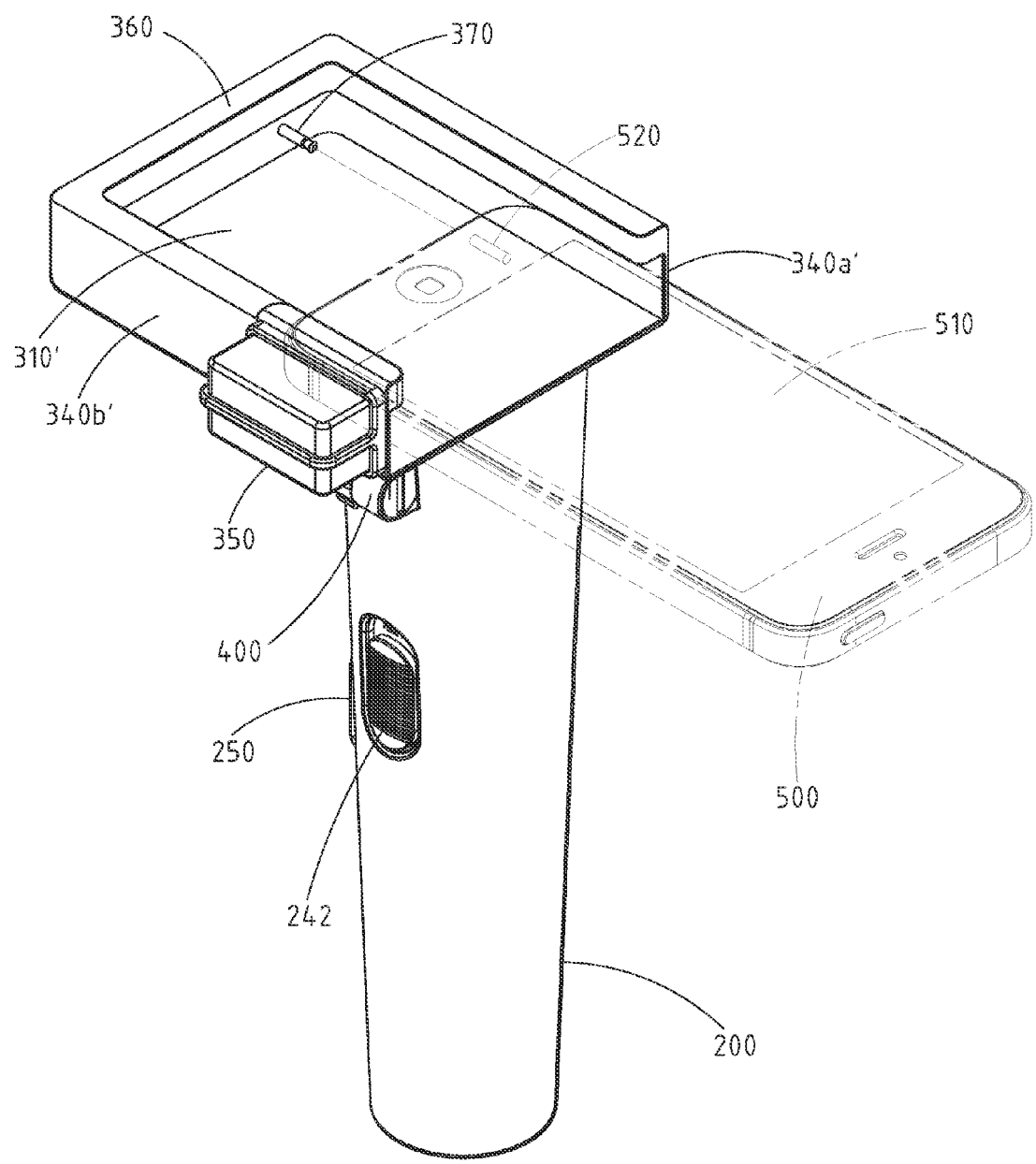
FIG. 14 is a perspective view of a handheld singing apparatus of a third embodiment of the disclosure.

FIG. 14 is a perspective view of a handheld singing apparatus 100 of a third embodiment of the disclosure. As shown in FIG. 14, the two sidewalls 340a', 340b' of this embodiment are connected to the blocking wall 360; but embodiments of the disclosure are not limited to disposing the sidewalls at two edges or three edges of the bottom wall 310 (310', 310"). In some embodiments of the disclosure, the sidewalls are disposed at the four edges of the bottom wall 310 (310', 310").

Figure 15:
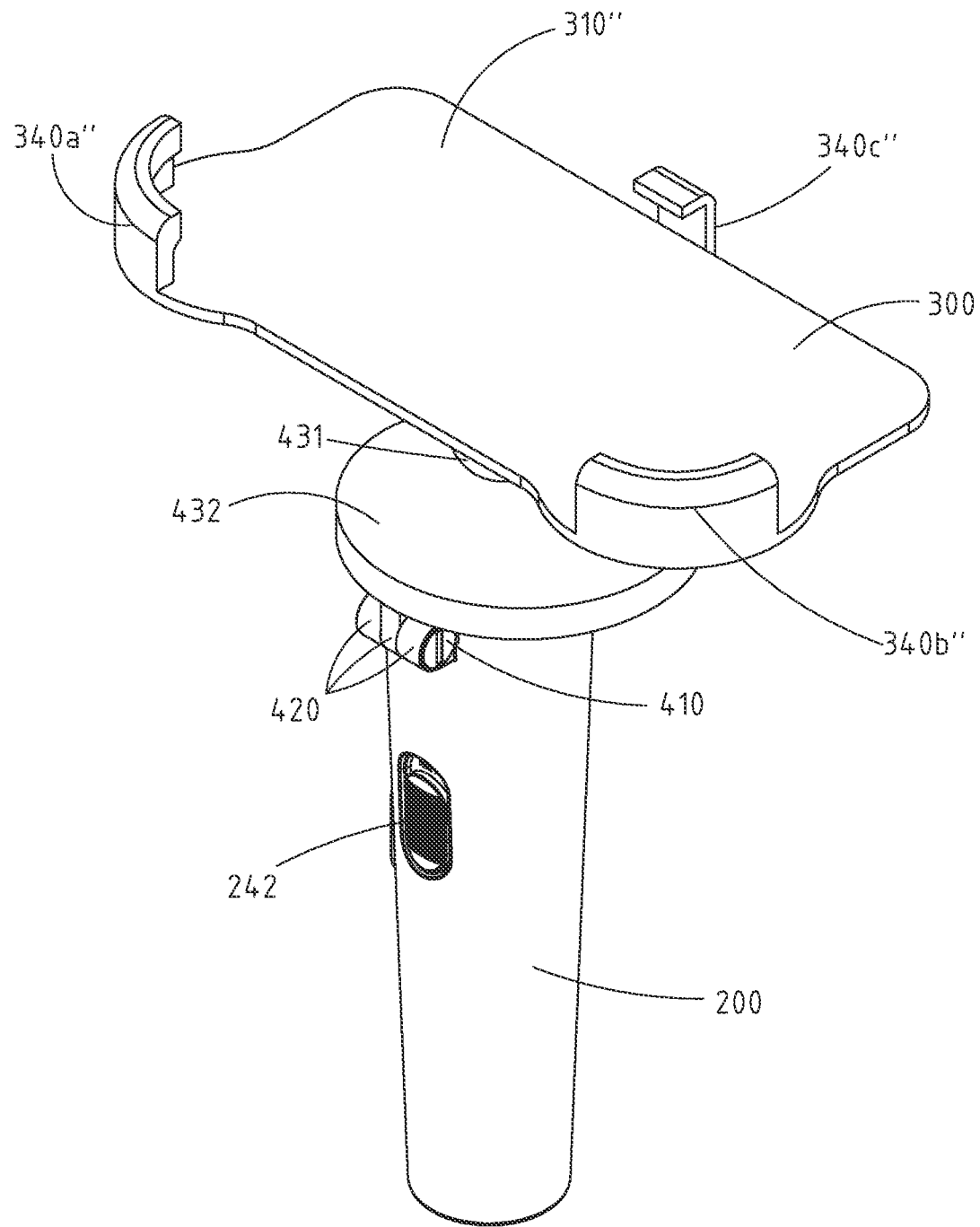
FIG. 15 is a perspective view of a handheld singing apparatus of a fourth embodiment of the disclosure.
Figure 16:
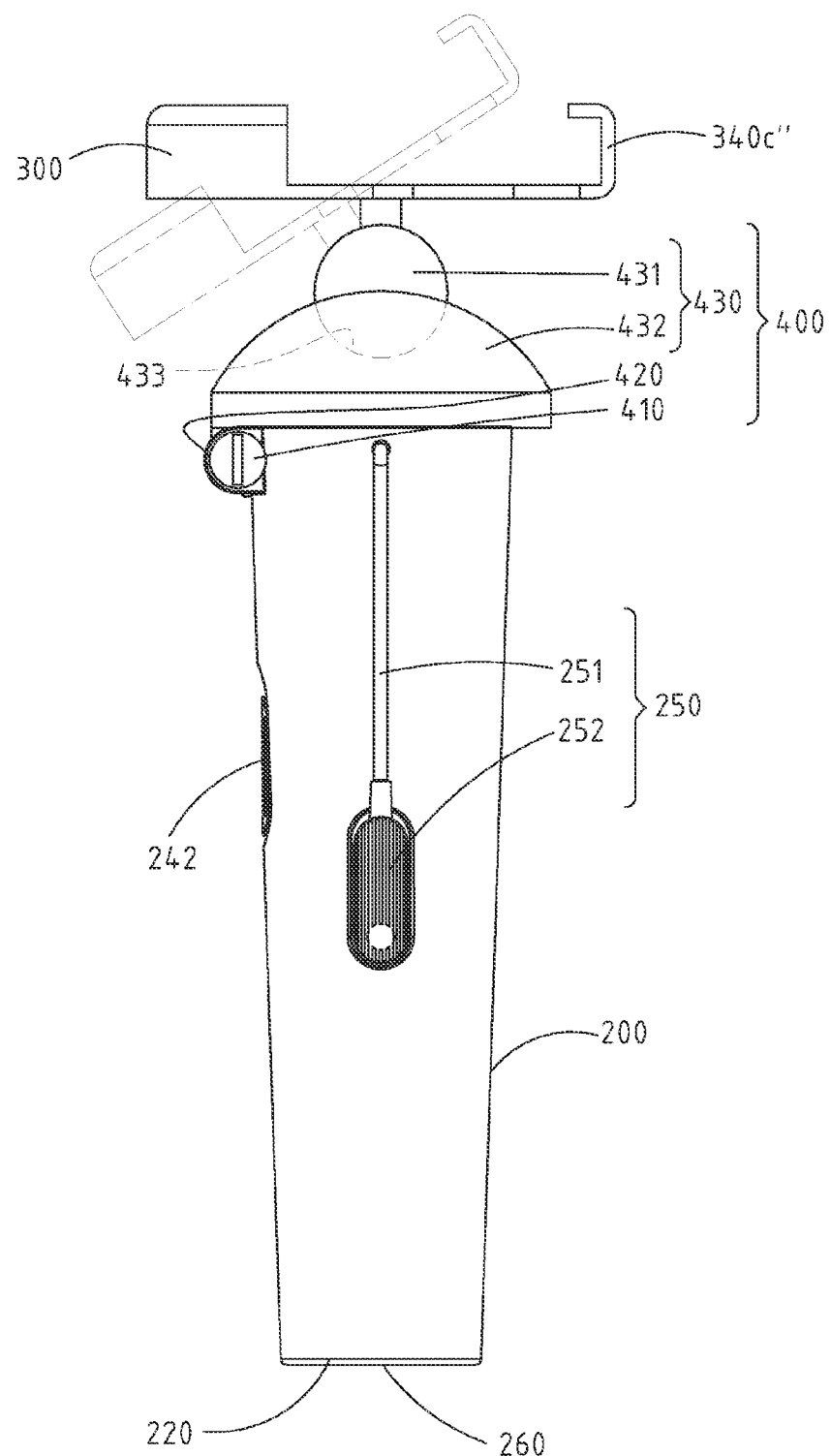
FIG. 16 is a lateral view of the handheld singing apparatus of the fourth embodiment of the disclosure.
Figure 17:
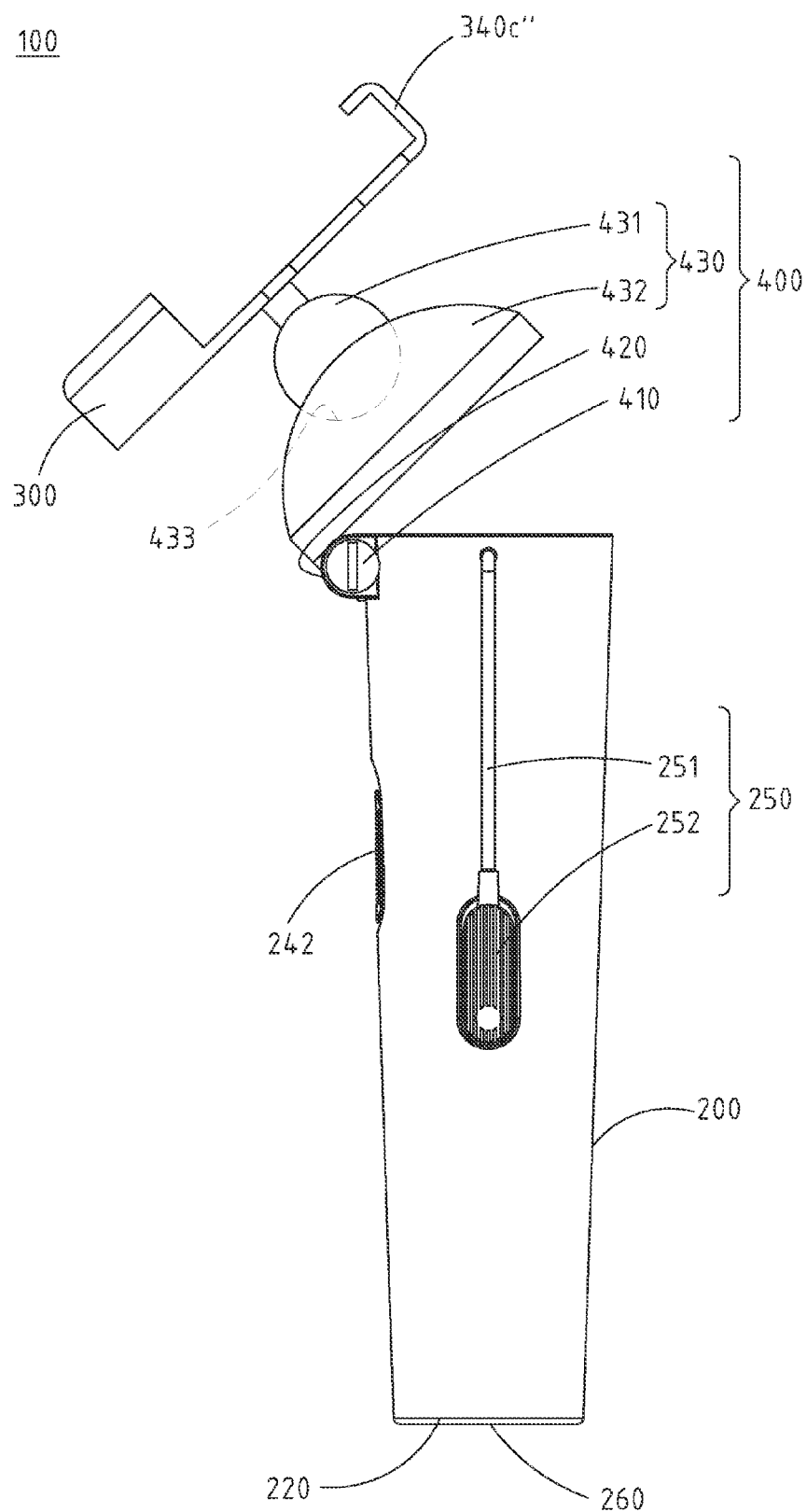
FIG. 17 is an operating schematic view of the handheld singing apparatus of the fourth embodiment of the disclosure.

FIG. 15 is a perspective view of a handheld singing apparatus 100 of a fourth embodiment of the disclosure. FIG. 16 is a lateral view of the handheld singing apparatus 100 of the fourth embodiment of the disclosure. FIG. 17 is an operating schematic view of the handheld singing apparatus 100 of the fourth embodiment of the disclosure.

Please refer to FIG. 15 and FIG. 16, the structures of the supporting seat 300 and the connecting portion 400 of the fourth embodiment are different from that of the first embodiment, and the structures and the operating principles of other components are similar to that of the first embodiment and can be referred thereto. In this embodiment, the handheld singing apparatus 100 does not have the audio receiving member 350, but embodiments of the disclosure are not limited thereto.

As shown in FIG. 15, the supporting seat 300 includes a bottom wall 310" and three sidewalls 340a", 340b", 340c". The bottom wall 310" is approximately formed as a rectangle and the four corners thereof are rounded. The two sidewalls 340a", 340b" are respectively disposed at two ends of one long edge of the bottom wall 310", and the sidewall 340c" is disposed at the middle portion of the other long edge of the bottom wall 310" for buckling and fastening with the handheld electronic device 500, but embodiments are not limited thereto; for instance, the two sidewalls 340a", 340b" are respectively disposed at two ends of one short edge of the bottom wall 310", and the sidewall 340c" is disposed at the middle portion of the other short edge of the bottom wall 310".

Please refer to FIG. 15 and FIG. 16, in which embodiment the connecting portion 400 includes the pivot shaft 410 and the pivot holes 420 as mentioned above and a universal joint 430. The universal joint 430 includes a ball member 431 and a bowl member 432. The ball member 431 is securely connected to the lower face of the bottom wall 310" of the supporting seat 300 (that is, the face of the bottom wall 310" near to the holding member 200). A center of the upper face of the bowl member 432 (that is, the face near to the holding member 200), is recessed inwardly to form a bowl groove 433. An inner diameter of the bowl groove 433 is substantially equal to a diameter of the ball member 431, so that the ball member 431 is capable of receiving into the bowl member 432. Therefore, the supporting seat 300 is rotatable freely relative to the holding member 200.

Please refer to FIG. 16 and FIG. 17, in which the bowl member 432 has the pivot holes 420 connected thereto, such that the bowl member 432 is pivotally connected to the holding member 200 which also has the pivot holes 420 via the pivot shaft 410. Based on this, the supporting seat 300 and the universal joint 430 are rotatable along a direction vertical to the pivot shaft 410. Therefore, the orientation between the supporting seat 300 and the holding member 200 is changeable due to the universal joint 430 and the pivot shaft 410, but embodiments of the disclosure are not limited thereto; in some cases, the supporting seat 300 does not have the pivoting means but merely connected with the holding member 200 via the universal joint 430.

Figure 18:
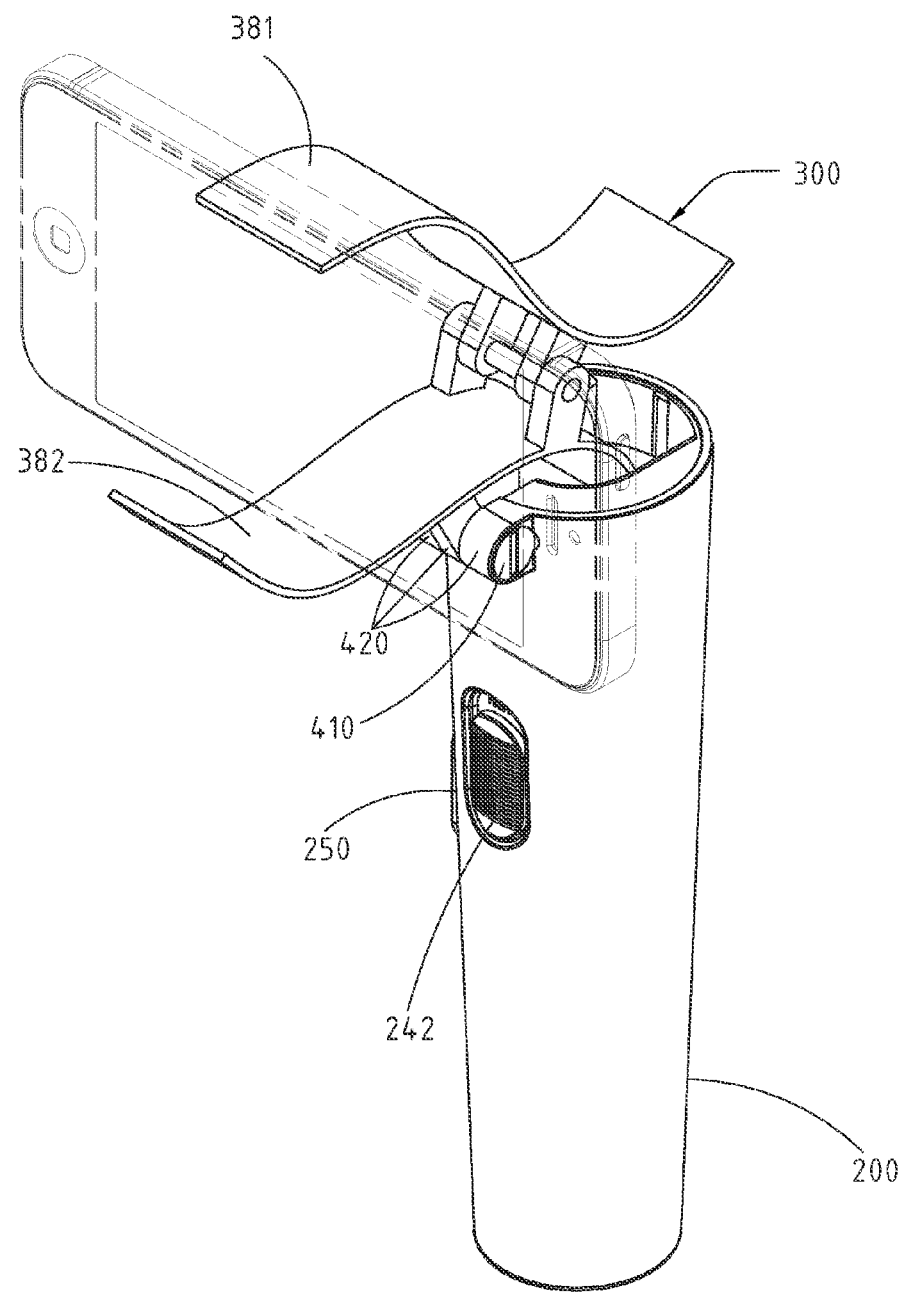
FIG. 18 is a perspective view of a handheld singing apparatus of a fifth embodiment of the disclosure.
Figure 19:
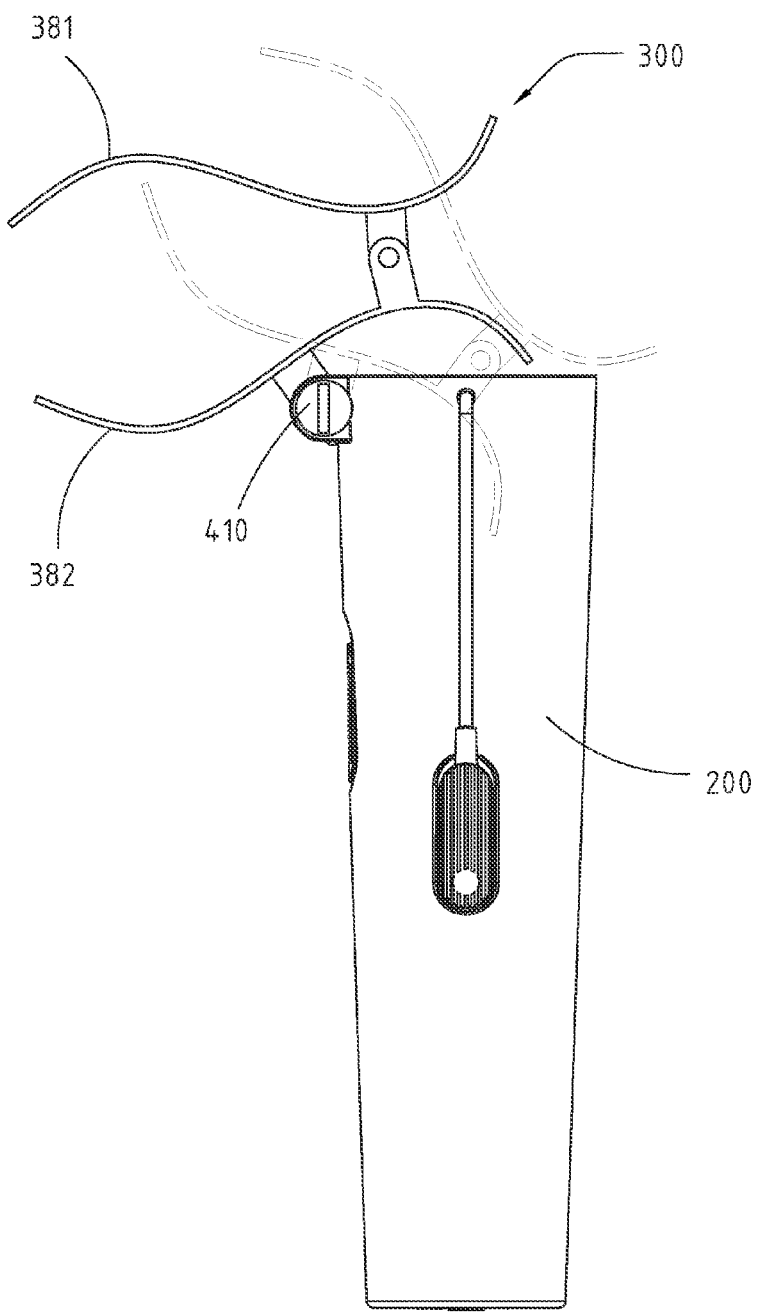
FIG. 19 is a lateral view of the handheld singing apparatus of the fifth embodiment of the disclosure.

FIG. 18 is a perspective view of a handheld singing apparatus 100 of a fifth embodiment of the disclosure. FIG. 19 is a lateral view of the handheld singing apparatus 100 of the fifth embodiment of the disclosure.

Please refer to FIG. 18 and FIG. 19, in which the structure of the supporting seat 300 of the fifth embodiment is different from that of the aforementioned embodiments. In this embodiment, the supporting seat 300 is composed of an upper clamp arm 381 and a lower clamp arm 382 in which the upper clamp arm 381 and the lower clamp arm 382 are pivotally connected to each other. The pivoting portion between the upper clamp arm 381 and the lower clamp arm 382 has a resilient member (not shown), such as a spring, for providing the inward clamping force upon the two clamp arms 381, 382 being opened to clamp the handheld electronic device 500.

Figure 20:
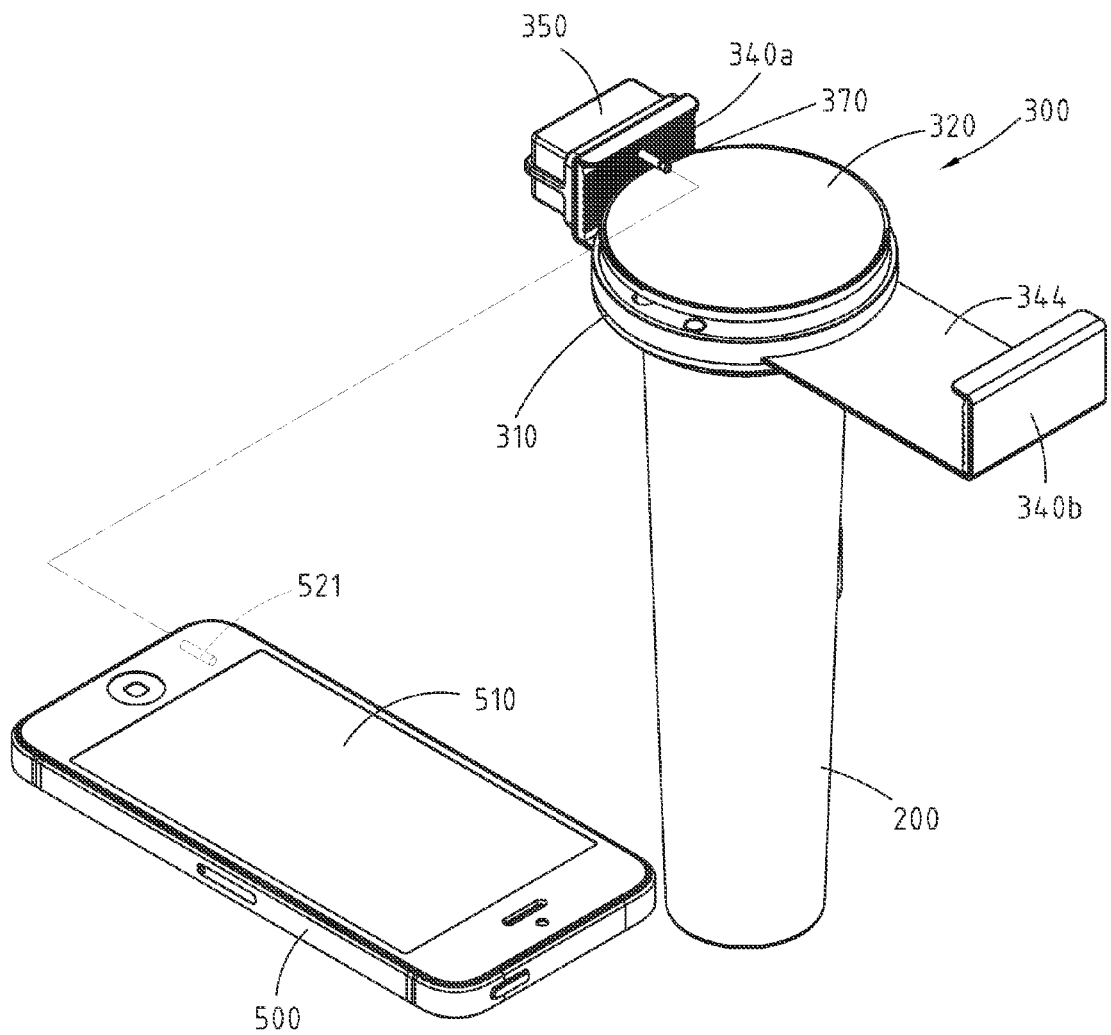
FIG. 20 is a perspective view of a handheld singing apparatus of a sixth embodiment of the disclosure.

FIG. 20 is a perspective view of a handheld singing apparatus 100 of a sixth embodiment of the disclosure.

Please refer to FIG. 1 and FIG. 20, in which in the first embodiment of the disclosure, the supporting seat 300 is fastened with the left and right sides of the handheld electronic device 500; while in this embodiment, the supporting seat 300 is fastened with the upper and lower sides of the handheld electronic device 500. As a result, the distance between the two sidewalls 340a, 340b of this embodiment is longer than that between the two sidewalls 340a, 340b of the first embodiment. Here, the length of the connecting wall 344 of the sidewall 340a is longer than that of the connecting wall 344 of the sidewall 340a of the first embodiment, but embodiments are not limited thereto; in some embodiments, the length of the connecting wall 344 of the sidewall 340b is longer than that of the connecting wall 344 of the sidewall 340b of the first embodiment.

It is understood that, in this embodiment, the handheld electronic device 500 has the audio port 521 assembled at a bottom portion thereof, thus the sidewall 340b has the connecting terminal 370 corresponding to the audio port 521 as mentioned in the third embodiment.

Figure 21:
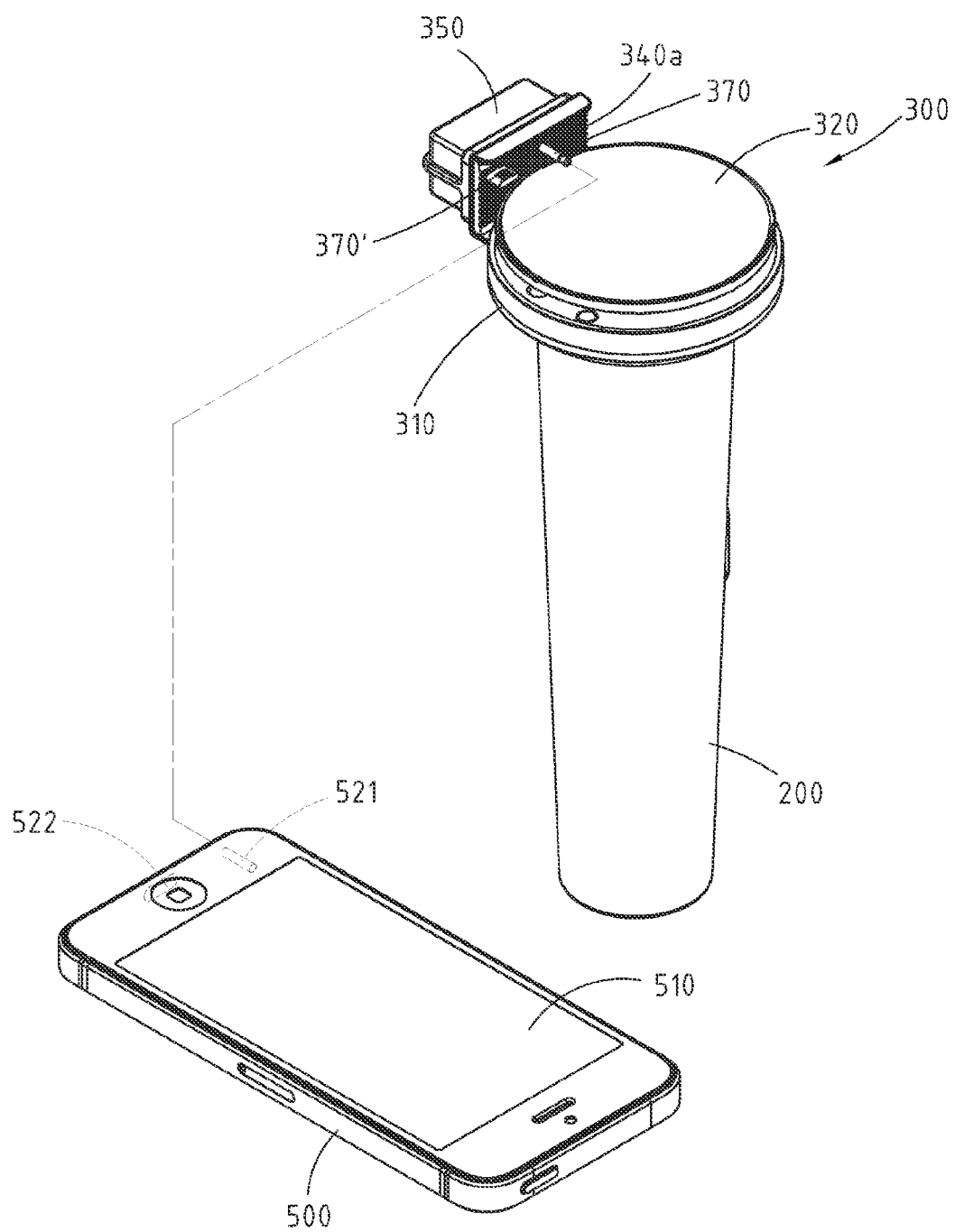
FIG. 21 is a perspective view of a handheld singing apparatus of a seventh embodiment of the disclosure.

In some embodiments, the handheld electronic device 500 has the data transmitting port 522 adjacent to the audio port 521 (as shown in FIG. 21), at the bottom portion thereof, thus the sidewall 340b has the connecting terminal 370' corresponding to the data transmitting port 522 disposed thereon (as shown in FIG. 21)

FIG. 21 is a perspective view of a handheld singing apparatus 100 of a seventh embodiment of the disclosure.

As shown in FIG. 21, in this embodiment, the supporting seat 300 does not have the sidewall 340b; that is, the supporting seat 300 of the seventh embodiment only has the sidewall 340a and at least one connecting terminal 370 (here, two connecting terminals 370, 370') is disposed on the sidewall 340a. In addition to providing a function of signal transmission, the connecting terminal 370, 370' can also provide a function for fastening the handheld electronic device 500 with the supporting seat 300 via the audio port 521 and the data transmitting port 522. Here, the connecting terminal 370 corresponds to the audio port 521, while the connecting terminal 370' corresponds to the data transmitting port 522.

Accordingly, although some figures of the aforementioned embodiments show the audio receiving member 350, the audio receiving member 350 can undoubtedly be replaced by the microphone built-in the handheld electronic device 500; conversely, while some figures of the aforementioned embodiments do not show the audio receiving member 350, the audio receiving member 350 is an option for every embodiment taught or described in the specification.

Similarly, the connecting terminal 370 is also an option for every embodiment taught or described in the specification. Here, the connecting terminal 370 and the audio cable 250 are presented alternatively.

In addition, although the embodiments only show that the connecting portion 400 is embodied via the pivot shaft 410 and/or the universal joint 430, but embodiments of the disclosure are not limited thereto; those who are skilled in the art can apply other connecting means for rotating the supporting seat 300 relative to the holding member 200.

As above, according to the handheld singing apparatus 100 of the disclosure, the user holds the holding member 200 with one hand easily, and the user operates the screen 510 of the handheld electronic device 500 with the other hand. Additionally, the angle of the supporting seat 300 is adjustable, so that the user can watch the screen 510 of the handheld electronic device 500 conveniently and comfortably. Furthermore, according to the disclosure, the singing of the user and the background music outputted from the handheld electronic device 500 are mixed by the mixer 243 and outputted through the audio outputting port 260, so that the user can hear the background music and the singing of the user clearly and simultaneously.

While the disclosure has been described by the way of example and in terms of the preferred embodiments, it is to be understood that the invention need not be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:

1. A handheld singing apparatus, being cooperated with a handheld electronic device having a screen for operation, comprising:
    a holding member, approximately formed as rod shaped, having a first end and a second end opposite to the first end;
    a supporting seat, capable of receiving and fastening with the handheld electronic device, so that the screen is faced to a direction far from the holding member; and
    a connecting portion, connected between the first end of the holding member and the supporting seat, so that the supporting seat is rotatable relative to the holding member, wherein the supporting seat comprises:
    a bottom wall;
    an abutting plate;
    an elastic member, connected between the bottom wall and the abutting plate and capable of pushing the abutting plate to move far from the bottom wall; and
    two sidewalls, opposingly disposed at two sides of the bottom wall, and bottom portions of the two sidewalls are connected to the bottom wall, wherein each sidewall includes a limiting wall located at a top thereof, and the limiting wall of one sidewall is extended toward the other sidewall, the handheld electronic device is abutted against between the two limiting walls and the abutting plate.

2. The handheld singing apparatus according to claim 1, wherein the holding member is extended from the first end toward the second end along one direction far from the screen.

3. The handheld singing apparatus according to claim 1, wherein the bottom is hollow and has a cavity, and the bottom wall has an opening disposed at the side thereof, a bottom of one of the two sidewalls is bent and extended to form a connecting wall, and the connecting wall passes though the opening, the bottom wall further comprises at least one elastic body connected between an inner wall of the cavity and the connecting wall.

4. The handheld singing apparatus according to claim 1, wherein a center of the bottom wall is recessed inward to form a positioning groove for receiving the elastic member.

5. The handheld singing apparatus according to claim 4, wherein the abutting plate has a positioning rod extended from a center thereof, the elastic member is a spring, the spring is winding on a periphery of the positioning rod and disposed in the positioning groove along with the positioning rod.

6. The handheld singing apparatus according to claim 1, wherein the handheld electronic device is buckled between the two sidewalls.

7. The handheld singing apparatus according to claim 1, wherein the supporting seat further comprises an audio receiving member, disposed at one side of one sidewall far from the other sidewall.

8. The handheld singing apparatus according to claim 7, wherein the audio receiving member is approximately formed as a cuboid, and an area of one face contacted to one sidewall is approximately equal to another area of the sidewall.

9. The handheld singing apparatus according to claim 7, wherein the holding member is hollowed and has a receiving space, the holding member further comprises:
  a signal processing circuit, disposed in the receiving space and connected electrically to the audio receiving member for receiving a first audio signal outputted from the audio receiving member, and the first audio signal being signally processed by the signal processing circuit for outputting; and
  an audio cable, comprising:
    a connecting wire, one end thereof being connected to the signal processing circuit to accept the first audio signal outputted from the signal processing circuit and passing through the holding member; and
    an audio terminal, disposed at the other end of the connecting wire for being inserted into an audio port of the handheld electronic device to output the first audio signal to the handheld electronic device.

10. The handheld singing apparatus according to claim 9, wherein the signal processing circuit comprises a sensitivity adjusting unit and a sensitivity adjusting switch, the sensitivity adjusting unit responds to a setting of the sensitivity adjusting switch to adjust an amplitude of the first audio signal.

11. The handheld singing apparatus according to claim 10, wherein the sensitivity adjusting switch is disposed at a lateral surface of the holding member.

12. The handheld singing apparatus according to claim 9, wherein the signal processing circuit comprises a mixer which receives and mixes the first audio signal with a second audio signal outputted from the handheld electronic device and passing through the audio cable for outputting a third audio signal.

13. The handheld singing apparatus according to claim 12, wherein the holding member further comprises an audio outputting port disposed at the second end thereof, the audio outputting port is connected to the mixer to accept the third audio signal.

14. The handheld singing apparatus according to claim 9, wherein a lateral surface of the holding member is recessed to form a receiving groove for receiving the audio terminal.

15. The handheld singing apparatus according to claim 1, wherein the supporting seat further comprises:
  a blocking wall, disposed at one side of an extension direction of the two sidewalls, and a bottom portion thereof being connected to the bottom wall; and
  a connecting terminal, disposed at one side of the blocking wall adjacent to the two sidewalls, so that when the handheld electronic device is received in the supporting seat, the connecting terminal is inserted into a connecting port of the handheld electronic device.

16. The handheld singing apparatus according to claim 15, wherein the two sidewalls are connected to the blocking wall.

17. The handheld singing apparatus according to claim 15, wherein the supporting seat further comprises an audio receiving member disposed at one side of one sidewall far from the other sidewall.

18. The handheld singing apparatus according to claim 1, wherein the supporting seat further comprises:
  a connecting terminal, disposed at one side of the sidewalls adjacent to the bottom wall, so that when the handheld electronic device is received in the supporting seat, the connecting terminal is inserted into a connecting port of the handheld electronic device.

19. The handheld singing apparatus according to claim 18, wherein the supporting seat further comprises an audio receiving member disposed at one side of the sidewall far from the bottom wall.

20. The handheld singing apparatus according to claim 19, wherein the holding member is hollowed and has a receiving space, the holding member further comprises:
  a signal processing circuit, disposed in the receiving space and connected electrically to the audio receiving member for receiving a first audio signal outputted from the audio receiving member, and the first audio signal being signally processed by the signal processing circuit for outputting to the connecting terminal, so that the first audio signal is sent to the handheld electronic device.

21. The handheld singing apparatus according to claim 20, wherein the signal processing circuit comprises a sensitivity adjusting unit and a sensitivity adjusting switch, the sensitivity adjusting unit responds to a setting of the sensitivity adjusting switch to adjust an amplitude of the first audio signal.

22. The handheld singing apparatus according to claim 21, wherein the sensitivity adjusting switch is disposed at a lateral surface of the holding member.

23. The handheld singing apparatus according to claim 20, wherein the signal processing circuit comprises a mixer which receives and mixes the first audio signal with a second audio signal outputted from the handheld electronic device and passing through the audio cable for outputting a third audio signal.

24. The handheld singing apparatus according to claim 23, wherein the holding member further comprises an audio outputting port disposed at the second end thereof, the audio outputting port is connected to the mixer to accept the third audio signal.

25. The handheld singing apparatus according to claim 1, wherein the connecting portion comprises a pivot shaft or a universal joint.

* * * * *